(12) United States Patent
Park et al.

(10) Patent No.: US 11,218,695 B2
(45) Date of Patent: Jan. 4, 2022

(54) METHOD AND DEVICE FOR ENCODING OR DECODING IMAGE

(71) Applicant: SAMSUNG ELECTRONICS CO., LTD., Suwon-si (KR)

(72) Inventors: Young-o Park, Seoul (KR); Jae-hwan Kim, Yongin-si (KR); Jong-seok Lee, Suwon-si (KR); Sun-young Jeon, Anyang-si (KR); Jeong-hoon Park, Seoul (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/622,139

(22) PCT Filed: Feb. 6, 2018

(86) PCT No.: PCT/KR2018/001539
§ 371 (c)(1),
(2) Date: Dec. 12, 2019

(87) PCT Pub. No.: WO2019/009488
PCT Pub. Date: Jan. 10, 2019

(65) Prior Publication Data
US 2020/0120340 A1    Apr. 16, 2020

(30) Foreign Application Priority Data
Jul. 6, 2017 (WO) ............... PCT/KR2017/007263

(51) Int. Cl.
*H04N 19/117* (2014.01)
*H04N 19/105* (2014.01)
(Continued)

(52) U.S. Cl.
CPC .......... *H04N 19/117* (2014.11); *G06N 3/084* (2013.01); *G06N 20/00* (2019.01); *G06T 9/002* (2013.01);
(Continued)

(58) Field of Classification Search
None
See application file for complete search history.

(56) References Cited

U.S. PATENT DOCUMENTS

2009/0034622 A1* 2/2009 Huchet ............... H04N 19/154
375/240.16
2012/0320973 A1 12/2012 Xu et al.
(Continued)

FOREIGN PATENT DOCUMENTS

EP         3 310 058 A1    4/2018
KR   10-2011-0049570 A    5/2011
(Continued)

OTHER PUBLICATIONS

Woon-Sung Park et al., "CNN-Based In-Loop Filtering for Coding Efficiency Improvement", Image, Video, and Multidimensional Signal Processing Workshop (IVMSP) 2016, IEEE, Jul. 11-12, 2016, 7 pages.
(Continued)

*Primary Examiner* — James M Anderson, II
(74) *Attorney, Agent, or Firm* — Sughrue Mion, PLLC

(57) ABSTRACT

Provided is in-loop filtering technology using a trained deep neural network (DNN) filter model. An image decoding method according to an embodiment includes receiving a bitstream of an encoded image, generating reconstructed data by reconstructing the encoded image, obtaining information about a content type of the encoded image from the bitstream, determining a deep neural network (DNN) filter model trained to perform in-loop filtering by using at least
(Continued)

one computer, based on the information about the content type, and performing the in-loop filtering by applying the reconstructed data to the determined DNN filter model.

16 Claims, 28 Drawing Sheets

(51) Int. Cl.
*H04N 19/65* (2014.01)
*H04N 19/82* (2014.01)
*G06N 20/00* (2019.01)
*G06N 3/08* (2006.01)
*G06T 9/00* (2006.01)

(52) U.S. Cl.
CPC .......... *H04N 19/105* (2014.11); *H04N 19/65* (2014.11); *H04N 19/82* (2014.11)

(56) References Cited

U.S. PATENT DOCUMENTS

| | | |
|---|---|---|
| 2014/0037015 A1 | 2/2014 | Ye et al. |
| 2016/0284060 A1* | 9/2016 | Allagadapa .............. G06T 5/002 |
| 2016/0292589 A1 | 10/2016 | Taylor, Jr. et al. |
| 2016/0364633 A1 | 12/2016 | Yang et al. |
| 2016/0379352 A1 | 12/2016 | Zhang et al. |
| 2017/0310974 A1 | 10/2017 | Guleryuz et al. |
| 2018/0227585 A1* | 8/2018 | Wang ................... H04N 19/136 |

FOREIGN PATENT DOCUMENTS

| | | |
|---|---|---|
| KR | 10-2013-0030254 A | 3/2013 |
| KR | 10-2015-0041098 A | 4/2015 |
| KR | 10-2017-0000767 A | 1/2017 |
| KR | 10-2017-0013302 A | 2/2017 |
| KR | 10-2017-0059040 A | 5/2017 |
| WO | 2016199330 A1 | 12/2016 |
| WO | WO-2016199330 A1 * | 12/2016 ........... H04N 19/109 |
| WO | 2017/036370 A1 | 3/2017 |

OTHER PUBLICATIONS

Yuanying Dai et al., "A Convolutional Neural Network Approach for Post-Processing in HEVC Intra Coding", MultiMedia Modeling 23rd International Conference, (MMM 2017), Springer International Publishing, Jan. 2017, 15 pages (28-39).
Written Opinion (PCT/ISA/237) and International Search Report (PCT/ISA/210) dated Apr. 5, 2018 issued by the International Searching Authority in International Application No. PCT/KR2017/007263.
Woonsung Park et al., "CNN (Convolutional Neural Network) Based In-loop Filter in HEVC", The Korean institute of Broadcast and Media Engineers Summer Conference, Jun. 29-Jul. 1, 2016, 418-421 13 pages (including Conf schedule).
Written Opinion (PCT/ISA/237) and International Search Report (PCT/ISA/210) dated May 9, 2018 issued by the International Searching Authority in International Application No. PCT/KR2018/001539.
Communication dated Feb. 7, 2020, issued by European Patent Office in counterpart European Patent Application No. 18828204.0.
Communication dated Sep. 23, 2020 by the European Patent Office in counterpart European Patent Application No. 18828204.0.
Communication dated Sep. 22, 2021, from the European Patent Office in European Application No. 18828204.0.

* cited by examiner

FIG. 23

| BLOCK SHAPE DEPTH | 0: SQUARE | 1: NS_VER | 2: NS_HOR |
|---|---|---|---|
| DEPTH D | 2300 | 2310 | 2320 |
| DEPTH D+1 | 2302 | 2312 | 2322 |
| DEPTH D+2 | 2304 | 2314 | 2324 |
| ... | ... | ... | ... |

METHOD AND DEVICE FOR ENCODING OR DECODING IMAGE

TECHNICAL FIELD

The present disclosure relates to a method of processing an image by using artificial intelligence (AI) using a machine learning algorithm. More particularly, the present disclosure relates to in-loop filtering technology using a deep neural network (DNN) in a process of encoding and decoding an image.

BACKGROUND ART

An artificial intelligence (AI) system is a computer system that may exhibit human-level intelligence and get smarter through self-learning and making decisions, and the more the AI system is used, the more its recognition rate improves.

AI technology includes machine learning (e.g., deep learning) using an algorithm that self-classifies/learns characteristics of input data, and element technologies using a machine learning algorithm to simulate functions of the human brain such as recognition and decision-making.

The element technologies include at least one of, for example, linguistic understanding for recognizing human languages/characters, visual understanding for recognizing objects in the manner of a human visual system, inference/prediction for judging information and logically inferring and predicting the same, knowledge representation for incorporating human experience information into knowledge data, and motion control for controlling self-driving of autonomous vehicles and the motion of robots.

In particular, visual understanding is a technology for recognizing and processing objects in the manner of a human visual system and includes object recognition, object tracking, image searching, person recognition, scene understanding, spatial understanding, and image enhancement.

DESCRIPTION OF EMBODIMENTS

Technical Problem

According to various embodiments, a method and apparatus for encoding/decoding an image are provided. Technical problems to be solved by the present disclosure are not limited to the above-described technical problems and one of ordinary skill in the art will understand other technical problems from the following description.

Solution to Problem

To solve the technical problems, an image decoding method according to an embodiment includes receiving a bitstream of an encoded image; generating reconstructed data by reconstructing the encoded image; obtaining information about a content type of the encoded image from the bitstream, determining a deep neural network (DNN) filter model trained to perform in-loop filtering by using at least one computer, based on the information about the content type; and performing the in-loop filtering by applying the reconstructed data to the determined DNN filter model.

Also, in the image decoding method according to an embodiment, the in-loop filtering may include at least one operation from among deblocking filtering, sample adaptive offset, and adaptive loop filtering.

Also, in the image decoding method according to an embodiment, the information about the content type may include information indicating a pixel complexity and a degree of motion of the encoded image.

Also, in the image decoding method according to an embodiment, the DNN filter model may be a network model trained to compensate for a quantization error of the reconstructed data according to an operation based on a weight of each of a plurality of network nodes constituting the DNN filter model and a connection relationship between the plurality of network nodes.

Also, in the image decoding method according to an embodiment, the determining of the DNN filter model may include determining the DNN filter model corresponding to the content type of the encoded image from among a plurality of DNN filter model candidates, based on the information about the content type.

Also, in the image decoding method according to an embodiment, each of the plurality of DNN filter model candidates may be trained to perform the in-loop filtering on a preset content type.

Also, in the image decoding method according to an embodiment, the determining of the DNN filter model may further include determining the DNN filter model corresponding to a compression strength of the encoded image from among the plurality of DNN filter model candidates.

Also, in the image decoding method according to an embodiment, the performing of the in-loop filtering may include performing the in-loop filtering by applying the reconstructed data and one or more reference images stored in a reconstructed picture buffer to the determined DNN filter model.

Also, in the image decoding method according to an embodiment, the in-loop filtering may be performed based on a convolutional neural network (CNN) learning model.

An image decoding apparatus according to an embodiment includes a receiver configured to receive a bitstream of an encoded image; and a decoder configured to generate reconstructed data by reconstructing the encoded image, obtain information about a content type of the encoded image from the bitstream, determine a deep neural network (DNN) filter model trained to perform in-loop filtering by using at least one computer based on the information about the content type, and perform the in-loop filtering by applying the reconstructed data to the determined DNN filter model.

An image encoding method according to an embodiment includes determining a content type of an input image; determining a deep neural network (DNN) filter model trained to perform in-loop filtering by using at least one computer, based on the content type; generating in-loop filtered data by applying, to the determined DNN filter model, reconstructed data of the input image reconstructed from encoded residual data; generating prediction data by predicting the input image based on the in-loop filtered data and generating residual data by using the input image and the prediction data; generating a bitstream by encoding information about the content type and the residual data; and transmitting the bitstream.

Also, in the image encoding method according to an embodiment, the in-loop filtering may include at least one operation from among deblocking filtering, sample adaptive offset, and adaptive loop filtering.

Also, in the image encoding method according to an embodiment, the information about the content type may include information indicating a pixel complexity and a degree of motion of the input image.

Also, in the image encoding method according to an embodiment, the DNN filter model may be a network model trained to compensate for a quantization error of the reconstructed data according to an operation based on a weight of each of a plurality of network nodes constituting the DNN filter model and a connection relationship between the plurality of network nodes.

Also, in the image encoding method according to an embodiment, the determining of the DNN filter model may include determining the DNN filter model corresponding to the content type of the encoded image from among a plurality of DNN filter model candidates, based on the information about the content type.

Advantageous Effects of Disclosure

Because in-loop filtering based on a trained deep neural network (DNN) is performed, encoding and decoding performance may be improved.

BRIEF DESCRIPTION OF DRAWINGS

FIG. 23 illustrates a process of determining a depth of a coding unit as a shape and size of the coding unit change, when the coding unit is recursively split such that a plurality of coding units are determined, according to an embodiment.

MODE OF DISCLOSURE

Figure 1:
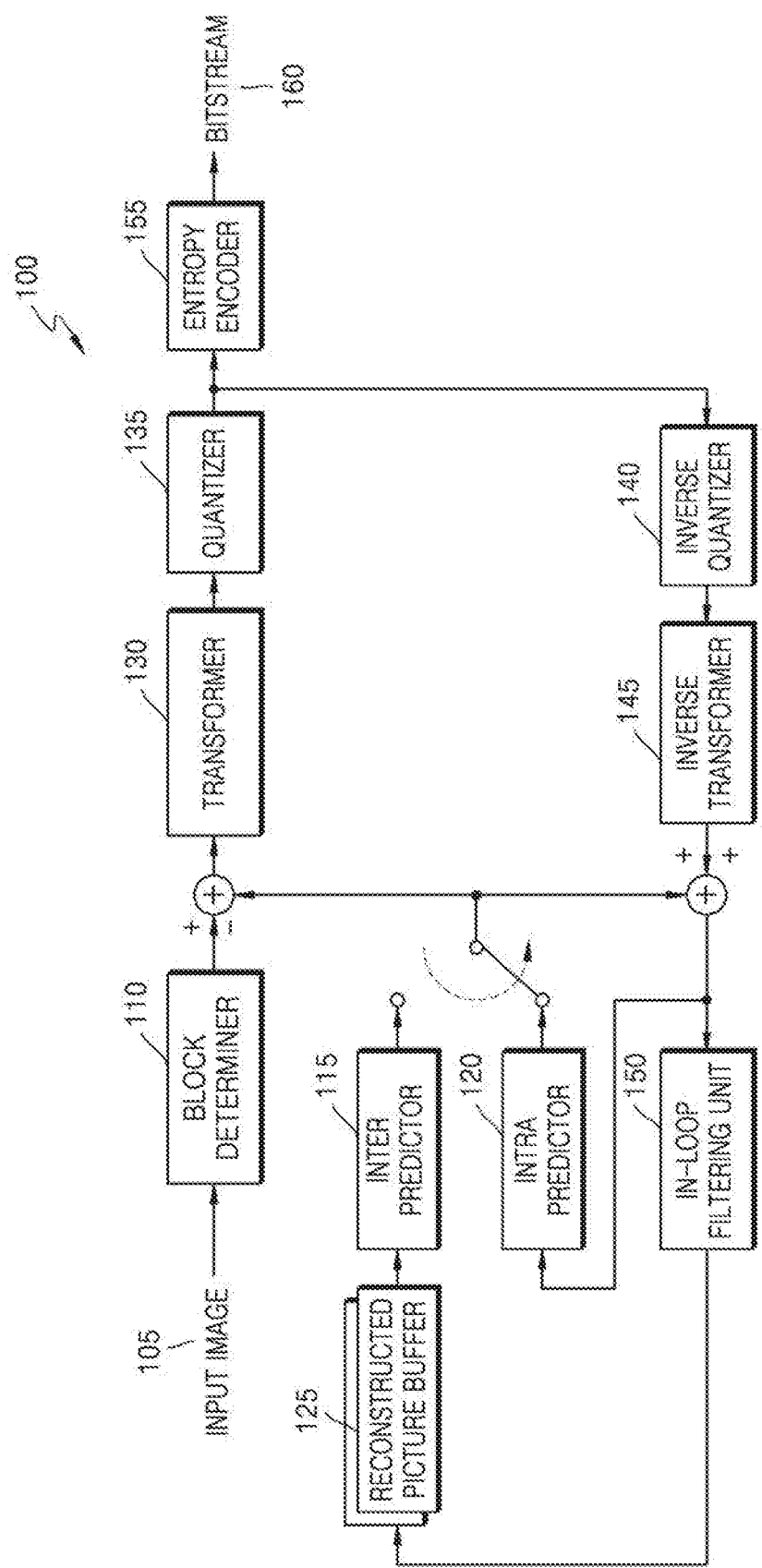
FIG. 1 is a detailed block diagram of an image encoding apparatus 100 according to an embodiment.

The term "unit" used in the specification refers to a software component or a hardware component such as a field-programmable gate array (FPGA) or an application-specific integrated circuit (ASIC), which performs certain tasks. However, the term "unit" is not limited to software or hardware. A "unit" may be configured to be in an addressable storage medium or configured to operate one or more processors. Thus, a "unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units".

Hereinafter, embodiments will be described in detail in order to fully convey the scope of the disclosure and enable one of ordinary skill in the art to easily embody and practice the disclosure. The disclosure may, however, be embodied in many different forms and should not be construed as being limited to the embodiments set forth herein. Also, parts in the drawings unrelated to the detailed description are omitted to ensure clarity of the present disclosure.

The terms used in the present disclosure are selected from among common terms that are currently widely used in consideration of their function in the present disclosure. However, the terms may be different according to an intention of one of ordinary skill in the art, a precedent, or the advent of new technology. Also, in particular cases, the terms may be discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the present disclosure.

The present disclosure relates to a method of processing an image by using artificial intelligence (AI) using a machine learning algorithm. More particularly, the present disclosure relates to in-loop filtering using a deep neural network (DNN) in a process of encoding and decoding an image.

An overall operation related to encoding and decoding of an image will now be described with reference to FIGS. 1 and 2. An in-loop filtering method using AI will be described with reference to FIGS. 3 through 12. A method of determining a data unit of an image according to an embodiment will be described with reference to FIGS. 13 through 26.

FIG. 1 is a detailed block diagram of an image encoding apparatus 100 according to an embodiment.

The image encoding apparatus 100 according to an embodiment includes a block determiner 110, an inter predictor 115, an intra predictor 120, a reconstructed picture buffer 125, a transformer 130, a quantizer 135, an inverse quantizer 140, an inverse transformer 145, an in-loop filtering unit 150, and an entropy encoder 155.

According to an embodiment, the block determiner 110 may split data of a current image into largest coding units according to a maximum size of a block for encoding an image. Each of the largest coding units may include blocks (i.e., coding units) split according to a block shape and a split shape. Image data in a spatial domain included in a largest coding unit according to an embodiment may be hierarchically classified according to a block shape and a split shape. A block shape of a coding unit may be a square shape, a rectangular shape, or any geometric shape, and thus is not limited to a data unit of a certain size.

When a size of a picture to be encoded is increased, an image may be encoded at a higher image compression ratio by being encoded in a larger unit. However, when a coding unit is increased and a size thereof is fixed, an image may not be efficiently encoded by reflecting characteristics of the image which are continuously changed.

For example, when a flat area of the sea or the sky is encoded, a compression ratio is higher as when a coding unit is larger, but, when a complicated area of people or a building is encoded, a compression ratio is higher as a coding unit is smaller.

To this end, the block determiner 110 according to an embodiment sets a largest coding unit of a different size for each picture or slice, and sets a block shape and a split shape of one or more coding units split from the largest coding unit. A size of the coding unit included in the largest coding unit may be variably set according to the block shape and the split shape.

A block shape and a split shape of one or more coding units may be determined based on a calculated rate-distortion (R-D) cost. The block shape and the split shape may be differently determined for each picture or slice, or may be differently determined according to each largest coding unit. The determined block shape and split shape is output from the block determiner 110 together with image data of each coding unit.

According to an embodiment, a coding unit split from a largest coding unit may be characterized according to a block shape and a split shape. A method of determining a coding unit according to a block shape and a split shape will be described in more detail below with reference to FIGS. 13 to 26.

According to an embodiment, coding units included in a largest coding unit may be predicted or transformed (e.g., by converting values of a pixel domain into values of a frequency domain) based on processing units of different sizes. In other words, the image encoding apparatus 100 may perform a plurality of processing operations to encode an image, based on processing units of various sizes and shapes. Processing operations such as prediction, transformation, and entropy encoding may be performed to encode image data, and processing units of the same size may be used in all operations or a processing unit of a different size may be used in each of the operations.

According to an embodiment, a prediction mode of a coding unit may include at least one of an intra mode, an inter mode, and a skip mode, and a specific prediction mode may be performed only for a coding unit of a specific size or shape. According to an embodiment, a prediction mode with a smallest coding error may be selected by performing prediction on each coding unit.

The image encoding apparatus 100 may transform image data based on a processing unit having a size different from that of a coding unit. The coding unit may be transformed based on a data unit having a size smaller than or equal to that of the coding unit.

According to an embodiment, the image encoding apparatus 100 may measure a coding error of the coding unit by using R-D optimization based on a Lagrangian multiplier.

According to an embodiment, a prediction mode of a coding unit may include at least one of an intra mode, an inter mode, and a skip mode, and a specific prediction mode may be performed only for a coding unit of a specific size or shape. According to an embodiment, a prediction mode with a smallest encoding error may be selected by performing prediction on each coding unit.

The intra predictor 120 performs intra prediction on a block of an intra mode in an input image 105, and the inter predictor 115 performs inter prediction on a block of an inter mode by using the input image 105 and a reference picture obtained from the reconstructed picture buffer 125. Whether to perform intra prediction or inter prediction may be determined for each block. The image encoding apparatus 100 may encode prediction-related information (e.g., a prediction mode for each coding unit).

Residual data is generated by calculating a difference between data for a coding unit of the input image 105 and prediction data for a coding unit of each mode output from the intra predictor 120 or the inter predictor 115. The residual data is output as a quantized transform coefficient for each transform unit through the transformer 130 and the quantizer 135. The quantized transform coefficient is reconstructed as residual data of a spatial domain by using the inverse quantizer 140 and the inverse transformer 145. The restored residual data of the spatial domain is added to the prediction data for the coding unit of each mode output from the intra predictor 120 or the inter predictor 115, and is thereby reconstructed as data of a spatial domain for the coding unit of the input image 105. The reconstructed data of the spatial domain is generated as a reconstructed image through the in-loop filtering unit 150.

The in-loop filtering unit 150 according to an embodiment may perform in-loop filtering based on a deep neural network (DNN) filter model, as described below. The in-loop filtering based on the DNN filter model according to an embodiment may include at least one operation from among deblocking filtering (DF), sample adaptive offset (SAO), and adaptive loop filtering (ALF). The in-loop filtering based on the DNN filter model according to an embodiment may be performed for each pixel or block (e.g., a largest coding unit or a coding unit).

The generated reconstructed image is stored in the reconstructed picture buffer 125. The reconstructed images stored in the reconstructed picture buffer 125 may be used as reference images for inter prediction of other images. The transform coefficient quantized by the transformer 130 and the quantizer 135 may be output to a bitstream 160 through the entropy encoder 155.

A result of encoding the residual data may be included in the bitstream 160 output from the image encoding apparatus 100. Also, a result of encoding information about a block shape, a split shape, a size of a transform unit, etc. may be included in the bitstream 160.

Figure 2:
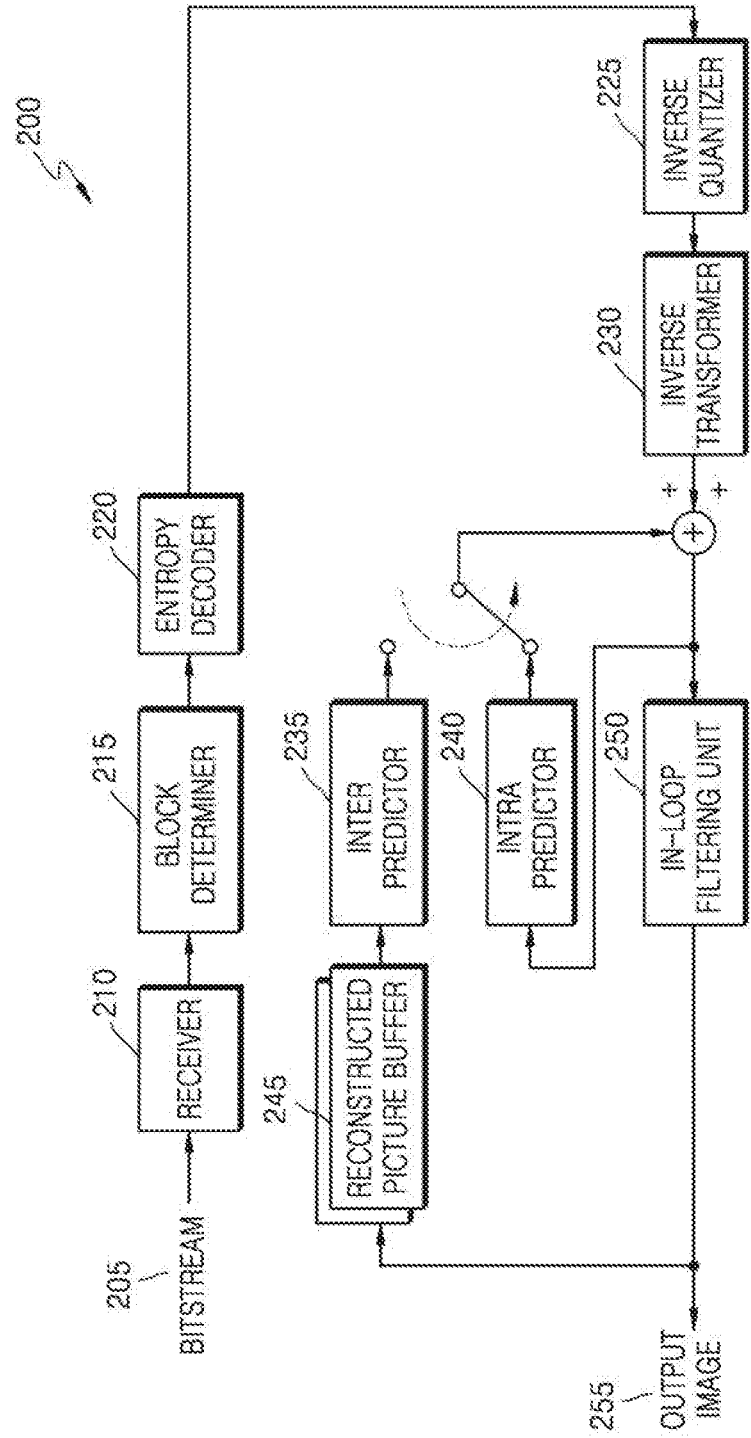
FIG. 2 is a detailed block diagram of an image decoding apparatus 200 according to an embodiment.

FIG. 2 is a detailed block diagram of an image decoding apparatus 200 according to an embodiment.

The image decoding apparatus 200 according to an embodiment performs operations for decoding an image. The image decoding apparatus 200 according to an embodiment includes a receiver 210, a block determiner 215, an entropy decoder 220, an inverse quantizer 225, an inverse transformer 230, an inter predictor 235, an intra predictor 240, a reconstructed picture buffer 245, and an in-loop filtering unit 250.

The receiver 210 of FIG. 2 receives a bitstream 205 of an encoded image.

According to an embodiment, the block determiner 215 may split image data of a current picture into largest coding units based on a maximum size of a block for decoding an image. Each of the largest coding units may include blocks (i.e., coding units) split according to a block shape and a split shape. The block determiner 215 according to an embodiment may obtain split information from the bitstream 205 and may hierarchically split image data of a spatial domain according to a block shape and a split shape. When blocks used for decoding have a certain shape and size, the block determiner 215 may split the image data without using the split information. The block determiner 215 according to an embodiment may correspond to the block determiner 110 of FIG. 1.

The entropy decoder 220 obtains, from the bitstream 205, encoded image data to be decoded and encoding information necessary for the decoding. The encoded image data is a quantized transform coefficient, and the inverse quantizer 225 and the inverse transformer 230 reconstruct residual data from the quantized transform coefficient.

The intra predictor 240 performs intra prediction on a block of an intra mode. The inter predictor 235 performs inter prediction on a block of an inter mode by using a reference picture obtained from the reconstructed picture buffer 245. Whether to perform intra prediction or inter prediction may be determined for each block. The image decoding apparatus 200 may obtain prediction-related information (e.g., a prediction mode for each coding unit) from the bitstream 205.

Data of a spatial domain for a block is reconstructed by adding prediction data for each block by using the intra predictor 240 or the inter predictor 235 to residual data, and the reconstructed data of the spatial domain may be output as a reconstructed image by using the in-loop filtering unit 250.

As described below, the in-loop filtering unit 150 according to an embodiment may perform in-loop filtering based on a DNN filter model. The in-loop filtering based on the DNN filter model according to an embodiment may include at least one operation from among DF, SAO, and ALF. The in-loop filtering based on the DNN filter model according to an embodiment may be performed for each pixel or block (e.g., a largest coding unit or a coding unit).

Image compression technology for each block has a problem in that a reconstructed image undergoes image quality degradation due to a quantization error. To solve the problem, various image compression standard techniques use an in-loop filter.

For example, in the H.264/AVC compression standard, an in-loop filtering method includes DF for removing blocking artifacts.

For example, an in-loop filtering method in the HEVC standard additionally includes SAO for compensating for loss of information occurring due to lossy compression such as quantization as well as DF. SAO is a method for removing ringing of a reconstructed image. SAO is a technique processed for each pixel (e.g., each sample) and performs interpolation on a reconstructed pixel by obtaining an optimal offset by performing RDO through statistical analysis. In the HEVC standard, DF is first applied to a reconstructed image and then SAO is performed on the reconstructed image on which the DF is completed. In a process of performing the SAO, an error between the reconstructed image and an original image may be minimized by adding an edge offset/band offset to the reconstructed image.

For example, an in-loop filtering method may include ALF. ALF may reduce an error between an original image and a reconstructed image on which filtering is completed by applying a Wiener filter to the reconstructed image.

The aforementioned in-loop filtering technology may not only improve subjective image quality but also improve coding efficiency by being used as a reference image in an inter prediction process.

Figure 3:
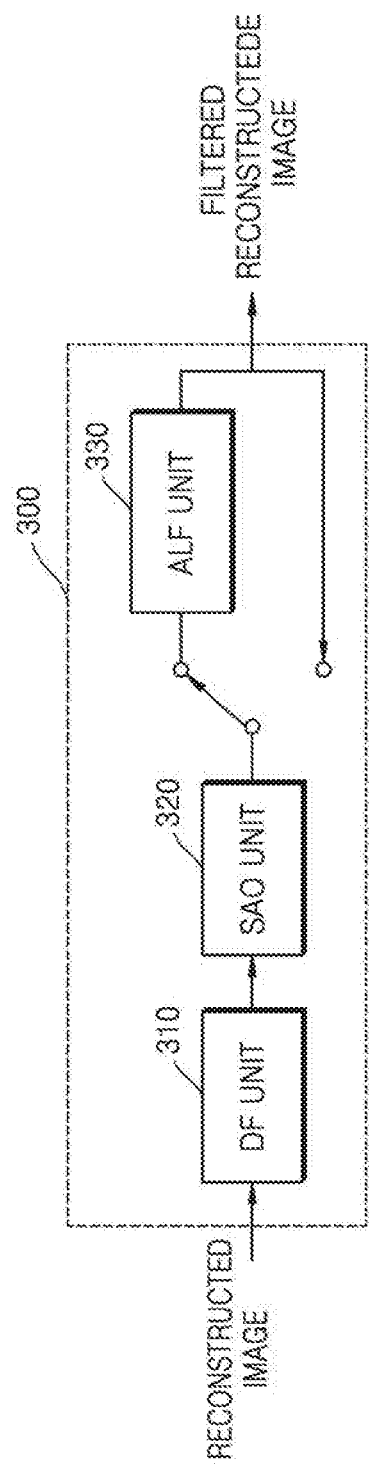
FIG. 3 is a block diagram of an in-loop filtering unit according to an embodiment.

FIG. 3 is a block diagram of an in-loop filtering unit according to an embodiment.

Referring to FIG. 3, an in-loop filtering unit 300 may include a DF unit 310, an SAO unit 320, and an ALF unit 330.

The in-loop filtering unit 300 may perform filtering on a reconstructed image in an order of DF, SAO, and ALF in a high efficiency (HE) condition, and may perform filtering in an order of DF and SAO, excluding ALF, in a low complexity (LC) condition.

The DF unit 310 may determine a filtering boundary based on a boundary of data units of a predetermined size or more from among blocks (e.g., coding units, prediction units, or transform units). For example, the DF unit 310 may determine only a boundary of blocks having a size equal to or greater than 32×32 as a filtering boundary to which DF is to be performed, may determine only a boundary of blocks having a size equal to or greater than 16×16 as a filtering boundary to which DF is to be performed, or may determine only a boundary of blocks having a size equal to or greater than 8×8 as filtering boundary to which DF is to be performed. Meanwhile, the DF unit 310 does not determine a boundary of data units having a predetermined size or more as a filtering boundary when the boundary is a frame boundary. That is, DF is not performed on an outermost boundary corresponding to an edge of a picture.

The DF unit 310 determines filtering strength at the filtering boundary based on a prediction mode of a coding unit to which adjacent pixels belong based on the filtering boundary and transform coefficient values of pixels adjacent to the filtering boundary.

The DF unit 310 determines filtering strength based on whether the prediction mode of the coding unit to which the adjacent pixels belong based on the filtering boundary is an intra mode or an inter mode and whether the transform coefficient values of the pixels adjacent to the filtering boundary are 0. When BS denotes boundary strength, the BS may be classified into three stages from 0 through 2. A size of the BS is proportional to the filtering strength. In other words, when BS=2, the filtering strength is the strongest and when BS=0, the filtering strength is the weakest. Here, DF may not be performed when BS=0.

The DF unit 310 may determine whether to perform DF on the filtering boundary based on the determined filtering strength and a result of comparing a predetermined threshold value and a difference between absolute values of pixel values of a predetermined number of adjacent pixels based on the filtering boundary. In detail, the DF unit 310 determines to perform DF only when an absolute value of a difference between pixel values of pixels adjacent to the filtering boundary and divided based on the filtering boundary and an absolute value of a difference between pixel values of pixels adjacent to the same side based on the filtering boundary are smaller than a predetermined threshold value determined according to a quantization parameter (QP) of transform units to which pixels belong, and the filtering strength is not the weakest. The threshold value may be pre-determined based on a QP used during quantization of blocks adjacent to the filtering boundary.

With respect to a boundary to which DF is to be performed, the DF unit 310 determines the number and filter tap coefficients of pixels to be filtered adjacent to a filtering boundary, based on filtering strength, an absolute value of a difference between pixel values of pixels adjacent to the filtering boundary and divided based on the filtering boundary, and an absolute value of a difference between pixel values of pixels adjacent to the same side based on the filtering boundary. Also, the DF unit 310 performs filtering by changing pixel values of pixels to be filtered via a weighted sum based on the filter tap coefficients.

The DF unit 310 may perform DF by using information about DF obtained from a bitstream. The information about the DF may include filtering boundary determination information such as a data unit size for determining a data unit on which the DF is performed from among boundaries of data units according to a tree structure.

The information about the DF may be signaled through a sequence parameter set, a picture parameter set, a video parameter set, a slice header, a slice segment header, or the like. However, the in-loop filtering unit 150 or 250 according to an embodiment may perform in-loop filtering based on a DNN filter model without signaling the information about the DF as described below.

The SAO unit 320 may receive a reconstructed image that is deblocking filtered, and applies SAO for minimizing an error between an original pixel and a reconstructed pixel according to each block (e.g., each largest coding unit or each coding unit) in an image. In this case, the SAO unit 320 may determine an SAO type according to a pixel value classification method of a current block. The SAO type may be determined as an edge type or a band type. According to a pixel value classification method of a current block, it may be determined whether to classify pixels of the current block according to the edge type or the band type.

When the SAO type is the edge type, according to a direction and a shape of edges formed between reconstructed pixels of the current block and their adjacent pixels, an offset between the reconstructed pixels and original pixels may be determined.

When the SAO type is the band type, from among a plurality of bands obtained by dividing a total range of pixel values of the reconstructed pixels of the current block, an offset between the reconstructed pixels and the original pixels included in each band may be determined. The bands may be obtained by evenly or unevenly dividing the total range of the pixel values.

Accordingly, the SAO unit 320 may determine the SAO type of the current block, which indicates the edge type or the band type, based on spatial characteristics of pixel values of the current block.

The SAO unit 320 may determine an SAO class of each of the reconstructed pixels according to the SAO type of the current block. The SAO class may be determined as an edge class or a band class.

With respect to the edge type, the edge class may indicate a direction of edges formed between the reconstructed pixels and their adjacent pixels. The edge class may indicate an edge direction of 0°, 90°, 45°, or 135°.

When the SAO type is the edge type, the SAO unit 320 may determine the edge class of each of the reconstructed pixels of the current block.

When the SAO type is the band type, from among a plurality of bands that are a predetermined number of continuous pixel value intervals obtained by dividing a total range of pixel values of the current block, the band class may indicate positions of the bands to which pixel values of the reconstructed pixels belong.

For example, with respect to a sample having a pixel value of 8 bits, a total range of the pixel value is from 0 to 255 and the pixel value may be classified into a total of 32 bands. In this case, from among the total of 32 bands, a predetermined number of bands to which pixel values of the reconstructed pixels belong may be determined. The band class may indicate a start position (a left start point) of a predetermined number of continuous bands by using one of band indices from 0 to 31.

With respect to the edge type, the reconstructed pixels of the current block may be classified into a predetermined number of categories according to a shape of edges formed between the reconstructed pixels and their adjacent pixels. For example, according to four edge shapes such as a local valley of a concave edge, a curved corner of a concave edge, a curved corner of a convex edge, and a local peak of a convex edge, the reconstructed pixels may be classified into four categories. According to an edge shape of each of the reconstructed pixels of the current block, one of the four categories may be determined.

With respect to the band type, according to positions of bands to which pixel values of the reconstructed pixels of the current block belong, the reconstructed pixels may be classified into a predetermined number of categories. For example, according to band indices of four continuous bands from a start position indicated by the band class, i.e., a start point of the leftmost band, the reconstructed pixels may be classified into four categories. According to one of the four bands, to which each of the reconstructed pixels of the current block belongs, one of the four categories may be determined.

The SAO unit 320 may determine a category of each of the reconstructed pixels of the current block. With respect to the reconstructed pixels of the current block, which belong to the same category, the SAO unit 320 may determine offset values by using difference values between the reconstructed pixels and the original pixels. In each category, an average of the difference values between the reconstructed pixels and the original pixels, i.e., an average error of the reconstructed pixels, may be determined as an offset value corresponding to a current category. The SAO unit 320 may determine an offset value of each category and may determine offset values of all categories as the offset values of the current block.

For example, when the SAO type of the current block is the edge type and the reconstructed pixels are classified into four categories according to edge shapes, or when the SAO type of the current block is the band type and the reconstructed pixels are classified into four categories according to indices of four continuous bands, the SAO unit 320 may determine four offset values by determining an average error between the reconstructed pixels and the original pixels, which belong to each of the four categories.

Each of the offset values may be greater than or equal to a preset minimum value and may be less than or equal to a preset maximum value.

The SAO unit 320 may signal SAO parameters including the SAO type, the SAO class, and the offset values of the current block. The SAO type may include an off type, an edge type, and a band type.

When the SAO type is the off type, it may be indicated that SAO is not applied to the current block. In this case, remaining SAO parameters of the current block do not need to be signaled.

When the SAO type is the edge type, the SAO parameters may include offset values individually corresponding to edge classes. When the SAO type is the band type, the SAO parameters may include offset values individually corresponding to bands.

The SAO parameters may be signaled through a sequence parameter set, a picture parameter set, a video parameter set, a slice header, a slice segment header, or the like. For example, a flag indicating whether SAO is performed from among the SAO parameters may be signaled through the sequence parameter set, and information indicating the SAO type, a merge flag, the SAO class, and the offset values may be signaled through SAO syntax. However, the in-loop filtering unit 150 or 250 according to an embodiment may perform in-loop filtering based on a DNN filter model without signaling the SAO parameters.

The ALF unit 330 signals information about ALF including information about whether to divide an image into blocks and apply ALF to each block and information about filter coefficients. The ALF unit 330 operates based on a Wiener filter, and performs optimal filtering by calculating an optimal coefficient for minimizing an error between an original image and a reconstructed image.

Filter coefficient information includes information about filter coefficients of each filter (e.g., a one-dimensional filter), and the filter coefficient information of each filter may include information on a difference value between successive filter coefficients. That is, a residual component of the filter coefficient of each filter may be encoded and signaled.

Information about ALF may include a type, a number, a size, a quantization bit, a coefficient, a filtering direction, whether to perform filtering, and whether to perform running filtering of each filter. Information about a filter set may be set according to data units such as pictures, slices, or sequences.

When a type of a filter is a Wiener filter, because filter coefficients may be determined by a cross-correlation matrix between filters, filter coefficient information may include information about the cross-correlation matrix instead of individual coefficients.

A filtering direction of each filter may be a filtering direction of pixels arranged on a straight line having a predetermined angle. For example, filtering may be performed in a filtering direction having a predetermined angle between $\pm 0°$ to $180°$ e.g., a vertical direction at an angle of $\pm 90°$, a horizontal direction at an angle of $0°$ or $180°$, or a diagonal direction at an angle of $\pm 45°$ or $\pm 135°$.

The ALF unit 330 may adaptively determine a filtering direction of each filter to characteristics of a local image in image data. For example, the ALF unit 330 may detect an edge of a local image in image data, and may determine a filter to perform filtering according to a filtering direction according to a direction of the detected edge.

The ALF unit 330 may determine whether to perform a running filtering method in which a result of filtering of a previous pixel affects filtering of a current pixel. In filtering according to the running filtering method, the result of the filtering of the previous pixel may be updated and the filtering of the current pixel may be performed by using filtered data of the previous pixel.

Information about ALF may be signaled through a sequence parameter set, a picture parameter set, a video parameter set, a slice header, a slice segment header, or the like. However, the in-loop filtering unit 150 or 250 according to an embodiment may perform in-loop filtering based on a DNN filter model without signaling the information about the ALF.

Although the SAO unit 320 may be similar to the ALF unit 330 because the SAO unit 320 directly calculates and compensates for an error between an original image and a reconstructed image, because the ALF unit 330 is not used in an LC condition, the SAO unit 320 may be understood as replacing a function of the ALF unit 330.

Figure 4:
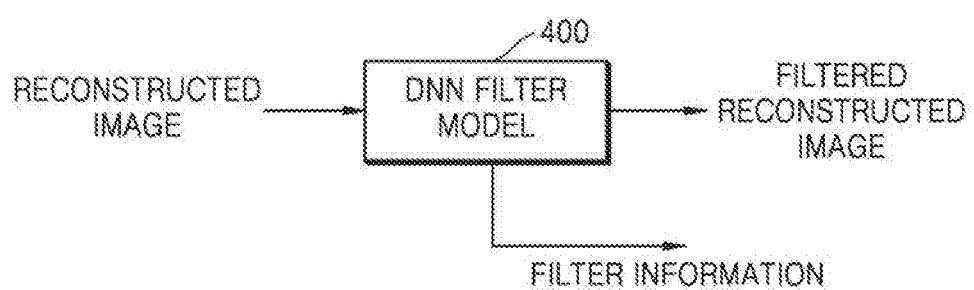
FIG. 4 is a block diagram of an in-loop filtering unit according to an embodiment.

FIG. 4 is a block diagram of an in-loop filtering unit according to an embodiment.

Referring to FIG. 4, a DNN filter model 400 is illustrated. The DNN filter model 400 according to an embodiment receives a reconstructed image and outputs a filtered reconstructed image. The DNN filter model 400 according to an embodiment may correspond to the in-loop filtering unit 150 of FIG. 1 or the in-loop filtering unit 250 of FIG. 2.

The DNN filter model 400 according to an embodiment performs in-loop filtering based on a DNN. The DNN filter model 400 is a network model trained to compensate for a quantization error of the reconstructed image according to an operation based on a weight of each of a plurality of network nodes constituting the DNN filter model 400 and a connection relationship between the plurality of network nodes.

That is, the DNN filter model 400 that is a learning model may be designed to simulate a structure of a human brain on a computer. For example, the DNN filter model 400 may include a plurality of network nodes having weights that simulate neurons of a human neural network. A connection relationship may be formed between the plurality of network nodes to simulate synaptic activity in which the neurons receive and transmit a signal through synapses.

The DNN filter model 400 may include, for example, an AI neural network model or a deep learning network model developed based on a neural network model. An architecture of a neural network will now be briefly described.

A neural network refers to a computational architecture that models a biological brain. The neural network is a recognition model implemented using software or hardware that imitates the computing ability of a biological system by using numerous artificial neurons that are connected through a connection line. Artificial neurons referred to as nodes are connected to one another, and collectively operate to process input data.

A neural network may include an input layer, a hidden layer, and an output layer. The input layer may receive an input for performing training and may transmit the input to the hidden layer, and the output layer may generate an output of the neural network based on a signal received from nodes of the hidden layer. The hidden layer may be located between the input layer and the output layer and may change training data transmitted through the input layer into an easily predicted value. Nodes included in the input layer and the hidden layer may be connected to each other through a connection line having a connection weight. Also, nodes included in the hidden layer and the output layer may be connected to each other through a connection line having a connection weight. Each of the input layer, the hidden layer, and the output layer may include a plurality of nodes.

The neural network may include a plurality of hidden layers. The neural network including the plurality of hidden layers is referred to as a DNN, and training of the DNN is referred to as deep learning. Nodes included in the hidden layers may be referred to as hidden nodes.

A DNN has a multilayer perceptrons structure including a plurality of hidden layers. The term "perceptron" refers to a mathematical model of each neuron (y=Wx+b), and a multilayer perceptron may improve the accuracy of prediction through learning using a backpropagation algorithm. A method in which the DNN is trained by using the backpropagation algorithm involves starting with an input layer; using a label value (e.g., data representing a correct answer or data with a smallest error with original data) when the y value is obtained through an output layer; in the case of an incorrect answer, transmitting the value from the output layer to the input layer; and updating the W and b values according to a calculated cost. A structure of the DNN will be described in detail with reference to FIG. 5.

When a DNN is trained by providing a specific input/output data set, the DNN learns a data pattern of the provided input/output data set at a higher level and generates a model deducing a filtered image most similar to original data.

An input data set of the in-loop filtering unit 150 or 250 according to an embodiment may be reconstructed data obtained by reconstructing an encoded image.

An output data set of the in-loop filtering unit 150 or 250 according to an embodiment may be data that minimizes an error (e.g., an error occurring due to lossy compression such as quantization) between original data and filtered reconstructed data. In this case, the output data set may be received by using at least one filtering method from among DF, SAO, and ALF described with reference to FIG. 3. The error between the original data and the filtered reconstructed data may be measured based on an R-D cost.

As such, when in-loop filtering is performed based on a DNN filter model trained to generate data with a smallest error between original data and filtered reconstructed data, signaling of information about DF, and information about ALF and SAO parameters described with reference to FIG. 3 is not required. This is because the trained DNN filter model has generalization ability to analyze an input pattern, find a feature of the input pattern, and perform optimal filtering. In-loop filtering based on a DNN filter model according to an embodiment uses a DNN trained to minimize an error between reconstructed data that is in-loop filtered and original data.

The DNN filter model 400 according to an embodiment may signal filter information. For example, the image decoding apparatus 200 may select a DNN filter model suitable for an image to be filtered based on the filter information obtained from the image encoding apparatus 100 and may apply the DNN filter model.

The filter information according to an embodiment may include information about error characteristics of an encoded image. Also, the information about the error characteristics may include at least one from among information about and a content type of an image and a QP. The content type according to an embodiment may indicate a category classified according to a predetermined criterion. Examples of the content type may include computer graphics, a general image, a motion blur, and a texture according to the error characteristics of the image. The content type according to an embodiment may be determined by the image encoding apparatus 100 based on at least one index from among a pixel complexity and a degree of motion of the image.

The DNN filter model 400 according to an embodiment may determine one DNN filter model from among DNN filter model candidates by using filter information. In this case, the DNN filter model candidates may be preset according to content types and/or compression strengths (or QPs). For example, the DNN filter model candidates according to content types and/or compression strengths may be preset in the image decoding apparatus 200 according to a predefined rule.

Determining of the DNN filter model candidates and the DNN filter model will be described in detail with reference to FIG. 7.

The DNN filter model 400 may be implemented as a software module.

When the DNN filter model 400 is implemented as a software module (e.g., a program module including instructions), the DNN filter model 400 may be stored in a computer-readable recording medium.

Also, the DNN filter model 400 may be integrated as a hard chip and may become a part of the image encoding apparatus 100 or the image decoding apparatus 200. For example, the DNN filter model 400 may be manufactured as a dedicated hardware chip for AI, or may be manufactured as a part of an existing general-purpose processor (e.g., a central processing unit (CPU) or an application processor) or a graphics processor (e.g., a graphics processing unit (GPU)).

Also, the DNN filter model 400 may be provided as downloadable software. A computer program product may include a product (e.g., a downloadable application) that is electronically distributed as a software program through an electronic market or a manufacturer of the image encoding apparatus 100 or the image decoding apparatus 200. For electronic distribution, at least a part of the software program may be stored in a storage medium or may be temporarily generated. In this case, the storage medium may be a storage medium of a server of the manufacturer, a server of the electronic market, or a relay server.

Figure 5:
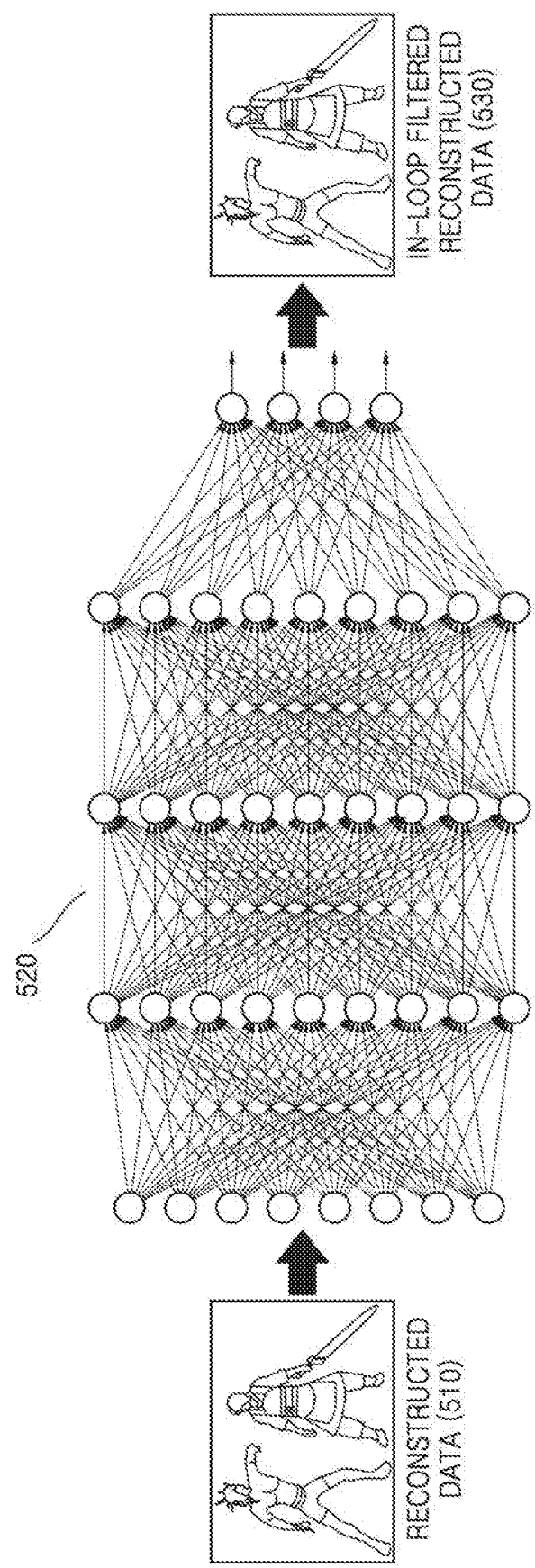
FIG. 5 is a diagram illustrating a structure of a deep neural network (DNN).

FIG. 5 is a diagram illustrating a structure of a DNN.

Referring to FIG. 5, reconstructed data 510, a DNN 520, and in-loop filtered reconstructed data 530 are illustrated.

The reconstructed data 510 may be input as training data to an input layer of the DNN 520. The data transmitted through the input layer of the DNN 520 may be changed into an easily predicted value in a hidden layer. The hidden layer is connected between the input layer and an output layer through a connection line having a connection weight. The output layer of the DNN 520 may generate an output, that is, the in-loop filtered reconstructed data 530, based on a signal received from nodes of the hidden layer. Each of the input layer, the hidden layer, and the output layer may include a plurality of nodes, and the DNN 520 may generate a mapping between the reconstructed data 510 and the in-loop filtered reconstructed data 530 through an algorithm between the plurality of nodes. When the DNN 520 is trained to output the in-loop filtered reconstructed data 530 with a smallest error with original data, the DNN 520 has generalization ability for generating a relatively correct output for an input pattern that is not used for training.

The DNN 520 according to an embodiment may include a set of layers including a convolution pooling layer, a hidden layer, and a fully connected layer. For example, an overall structure of the DNN 520 may be formed so that the hidden layer is connected to the convolution pooling layer and the fully connected layer is connected to the hidden layer.

According to an embodiment, the DNN 520 may be implemented as a convolutional neural network (CNN) including a convolution layer.

The CNN suitable for image analysis may have a structure in which a feature extraction layer that self-learns a feature with greatest discriminative power from given image data and a prediction layer that learns a prediction model to exhibit highest prediction performance based on the extracted feature are integrated.

The feature extraction layer may have a structure in which a convolution layer that creates a feature map by applying a plurality of filters to each area of an image and a pooling layer that enables to extract a feature which is not changed over a change in position or rotation by spatially integrating the feature map are alternately repeated several times. This enables extraction of various levels of features from a low-level feature such as a point, a line, a surface, or the like to a complex and meaningful high-level feature.

The convolution layer obtains a feature map by taking a nonlinear activation function to an inner product of a filter and a local receptive field for each patch of an input image, and compared with other network structures, the CNN uses a filter having shared weights and sparse connectivity. This connection structure reduces the number of parameters to be trained and makes training through a backpropagation algorithm efficient, resulting in improved prediction performance.

The pooling layer (or sub-sampling layer) creates a new feature map by utilizing area information of a feature map obtained from a previous convolution layer. In general, the feature map newly created by the pooling layer is reduced to a size smaller than an original feature map and a representative integration method includes maximum pooling to select a maximum value of a corresponding area in the feature map and average pooling to obtain an average value of the corresponding area in the feature map. The feature map of the pooling layer may generally be less affected by a certain structure or a position of a pattern present in the input image, relative to a feature map of a previous layer. That is, the pooling layer may extract a feature more robust to a local change such as noise or distortion in the input image or the previous feature map, and the feature may play an important role in classification performance. Another role of the pooling layer is to reflect a feature of a wider area as it goes from a deep structure to an upper learning layer, and as the feature extraction layer accumulates, a feature map that reflects a local feature in a lower layer and reflects a feature of an entire abstract image toward an upper layer may be generated.

Regarding features finally extracted through repetition of the convolution layer and the pooling layer, a classification model such as a multilayer perception (MLP) or a support vector machine (SVM) is combined in the form of a fully connected layer to be used for classification model training and prediction.

The DNN may be implemented as any of various networks. For example, the DNN may be implemented as, but not limited to, a CNN, a recurrent neural network (RNN), a deep belief network (DBN), or a restricted Boltzmann machine (RBM).

FIGS. 6A through 6F are diagrams illustrating structures of various CNNs.

Figure 6A:
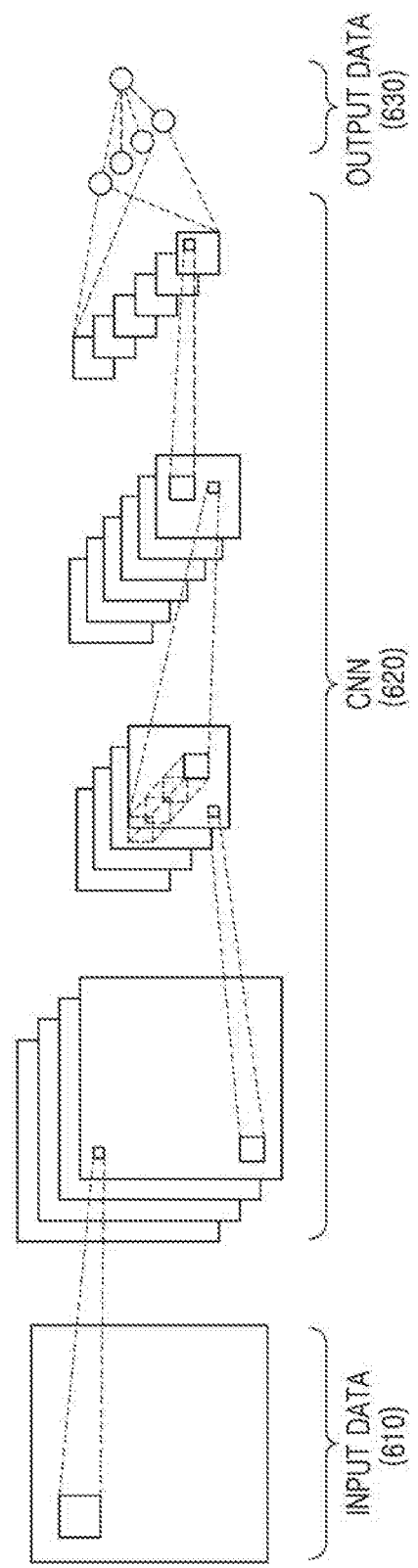
FIGS. 6A through 6F are diagrams illustrating structures of various CNNs.

Referring to FIG. 6A, a structure of a basic CNN according to an embodiment is illustrated.

Referring to FIG. 6A, input data 610 is input through an input layer of a CNN 620 and output data 630 is output through an output layer of the CNN 620.

The input data 610 according to an embodiment may be reconstructed data, and the output data 630 may be in-loop filtered reconstructed data.

A plurality of hidden layers may be provided between the input layer and the output layer. Each of layers constituting the hidden layers may include a convolution layer and a sub-sampling layer. The convolution layer performs a convolution operation on image data input to each layer by using a convolution filter and generates a feature map. In this case, the feature map refers to image data that represents various features. The sub-sampling layer reduces a size of the feature map through sampling or pooling. The output layer of the CNN 620 classifies a class of the image data by combining various features represented in the feature map. In this case, the output layer may include a fully connected layer.

A structure (e.g., the number of hidden layers and the number and size of filters in each layer) of the CNN according to an embodiment is pre-determined, and a weight matrix of a filter (in particular, a convolution filter) in each layer is set to an appropriate value by using data for which correct classification is already known. The data for which correct classification is already known is used as 'training data'. In this case, a process of determining the weight matrix of the filter refers to 'training'.

For example, in the structure of the CNN 620, the number of filters per layer may be 64, and a size of each filter may be 3×3. Also, for example, in the structure of the CNN 620, a total number of layers may be 10. However, the above embodiment is merely an example, and the number of hidden layers, the number and size of filters in each layer may be modified in various ways.

Figure 6B:
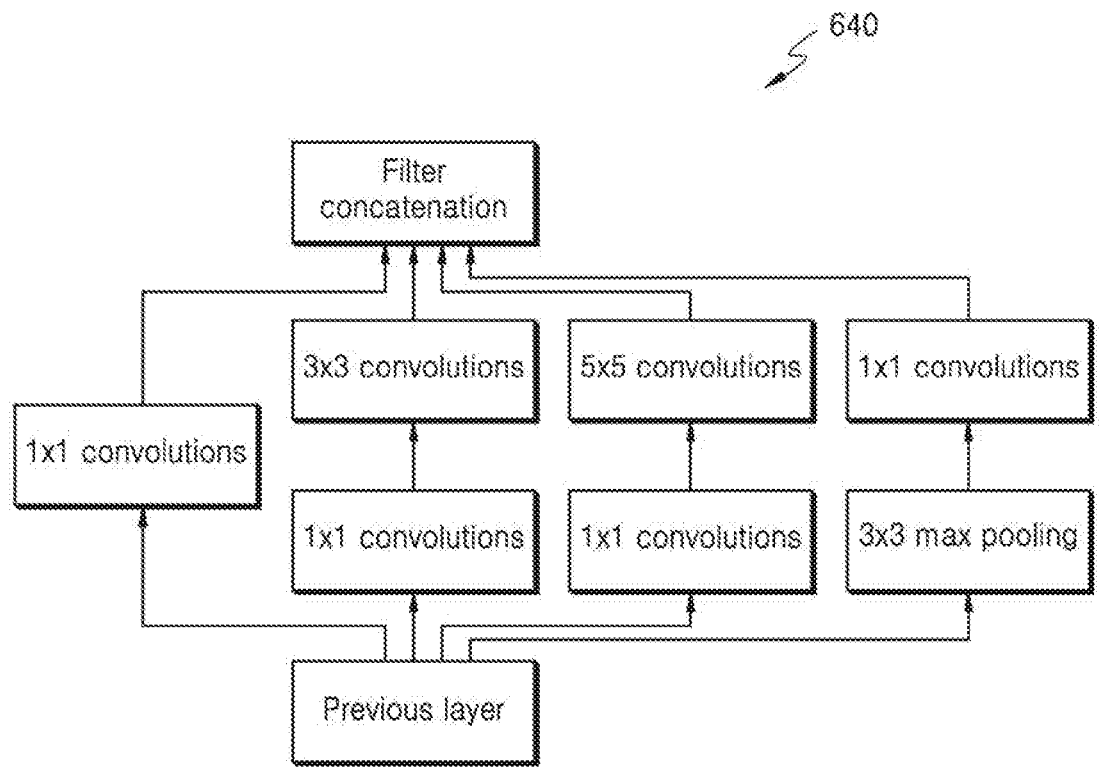

Referring to FIG. 6B, a structure of a CNN according to another embodiment is illustrated.

A CNN 640 of FIG. 6B may be a network including a plurality of parallel layers. That is, a plurality of convolution layers and pooling layers may be arranged in parallel. In the CNN 640, a result output from a previous layer may be input to a plurality of separated parallel layers. The plurality of separated parallel layers may apply different filters. For example, the plurality of separated parallel layers may be reduced to a 1×1 convolution and then 3×3 or 5×5 convolutions may be applied. In another layer, 3×3 max pooling may be performed and then a convolution may be applied. A layer using only a 1×1 convolution may function as an identity loop for maintaining initial information. The plurality of parallel layers that have undergone convolution may be finally concatenated and may be output as a calculation result of a current layer. According to the CNN 640, layers do not need to be always sequentially stacked. The structure of the CNN 640 is based on the fact that a network having a non-sequentially optimized structure has a smaller error than a network having a sequential structure.

Figure 6C:
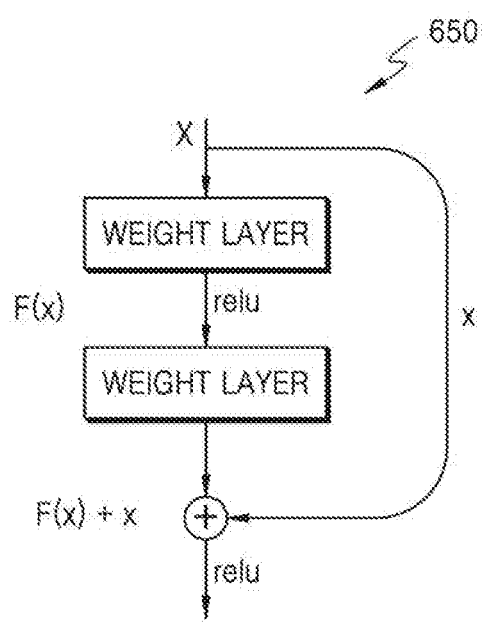

Referring to FIG. 6C, a structure of a CNN according to another embodiment is illustrated.

A CNN 650 of FIG. 6C is a network using the concept of a skip layer. The CNN 650 has a structure in which an input of a past layer is added to an output of a current layer. In the CNN 650, a result obtained by adding outputs of the current layer and the past layer may become an input of a next layer. In a general CNN structure, a result value may be excessively small through a convolution and pooling process in multiple layers. In this case, detailed information of the result value may disappear. The CNN 650 may reinforce detailed part by re-using a past result in the convolution and pooling process.

Figure 6D:
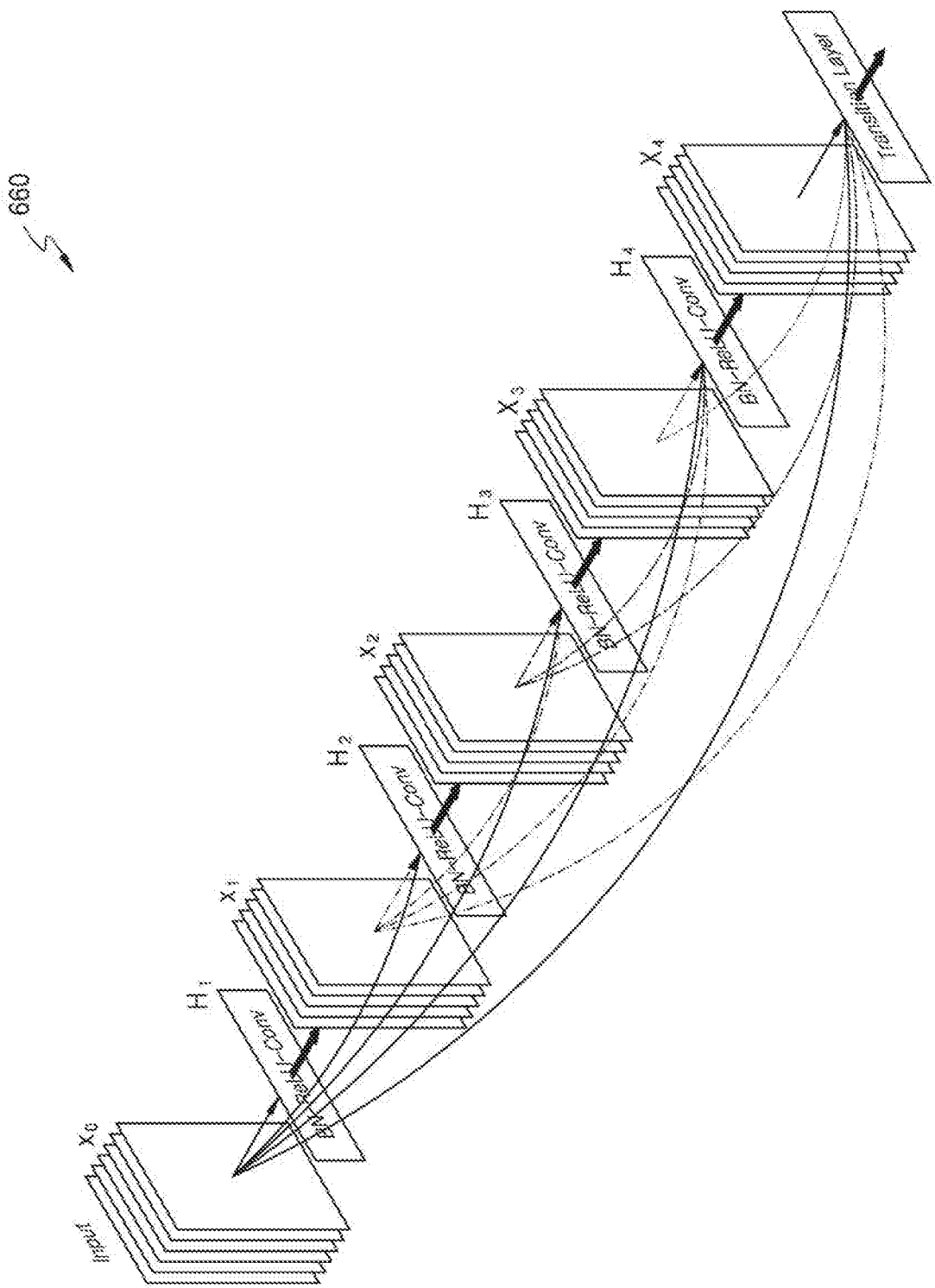

Referring to FIG. 6D, a structure of a CNN according to another embodiment is illustrated.

A CNN 660 of FIG. 6D is a network using the concept of a skip layer, like the CNN 650 of FIG. 6C. However, a relationship between layers in the CNN 660 is denser than that in the CNN 650 because a past result may be added as an input of a layer at an arbitrary position. Furthermore, the CNN 660 may use a result calculated by a past layer through a convolution operation as an input of the layer at the arbitrary position.

Figure 6E:
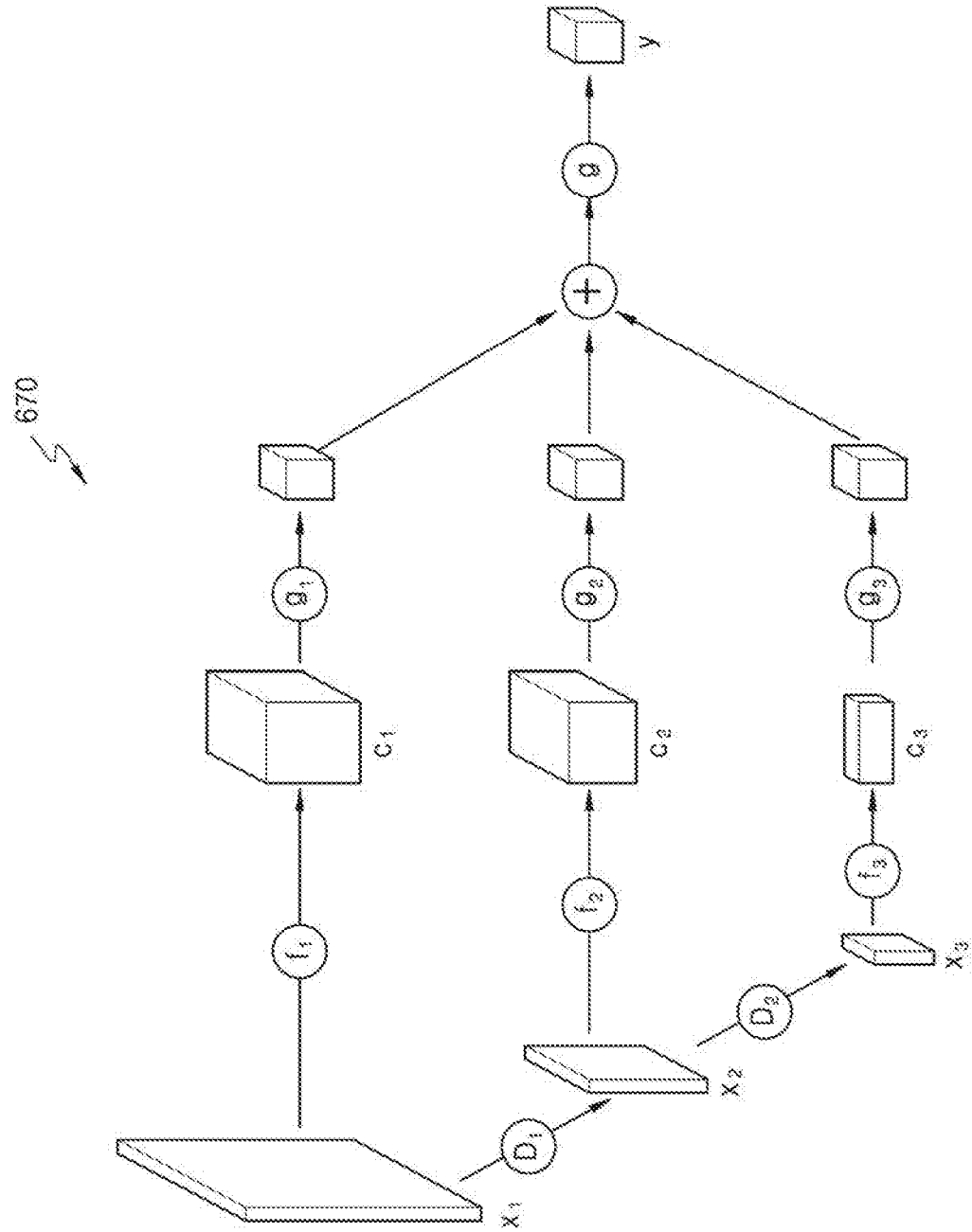

Referring to FIG. 6E, a structure of a CNN according to another embodiment is illustrated.

A CNN 670 of FIG. 6E is a network using a multi-resolution pyramid structure. The CNN 670 may divide a result of a previous convolution layer into pyramids of multiple steps. For example, a resolution may not be scaled at a first step, may be scaled to ½×½ at a second step, and may be scaled to ¼×¼ at a third step. A result of the plurality of steps may be concatenated and may be used as an input of a fully connected layer. Although a convolution layer is not affected by a size of an image, because a fully connected layer is limited by a size of an input image, the size of the input image has to be fixed in a normal network. However, when features output at a plurality of steps of pyramid levels are used as an input of a fully connected layer and an output of a pyramid is pre-determined regardless of a size of an image like in the CNN 670, the fully connected layer may not be limited by the size of the image.

Figure 6F:
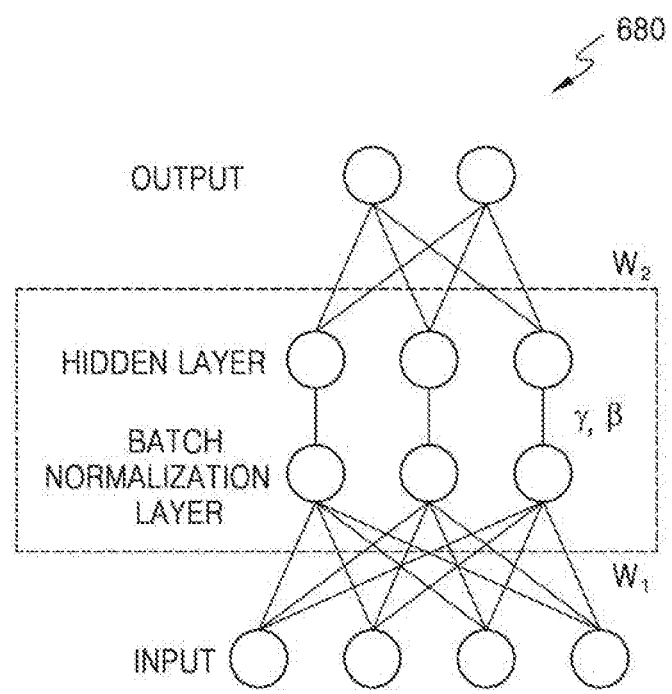

Referring to FIG. 6F, a structure of a CNN according to another embodiment is illustrated.

A CNN 680 of FIG. 6F is a network having a structure in which batch normalization is performed before or after a nonlinear function ReLu. A batch normalization layer is located at a front end of a hidden layer and controls a distribution of inputs. Also, because the batch normalization layer is a layer absorbed in a network, related variables (e.g., a scale and a shift) may be optimized through backpropagation. A method of improving a distribution of inputs may be a method of normalizing an average and a variance of data input to each layer to 0 and 1, multiplying a scale variable ($\gamma$), and adding the data by a shift variable ($\beta$). In this case, the scale and shift variables may be determined through training. The CNN 680 may prevent a problem such as gradient vanishing or gradient exploding by normalizing a convolution result. Also, a training time may be reduced through batch normalization, and the accuracy of training may be improved.

In the embodiment, the CNNs having various structures described with reference to FIGS. 6A through 6F may be applied, and combinations thereof or combinations with well-known learning networks may also be applied. Accordingly, it should be noted that the CNNs having various structures are merely examples for convenience of explanation and CNNs having various modified structures may be used in the present embodiment.

As described with reference to FIG. 4, a DNN of the DNN filter model 400 may be trained for each content type of an image and each QP. A method of using a DNN trained for each content type and each QP will now be described.

Figure 7:
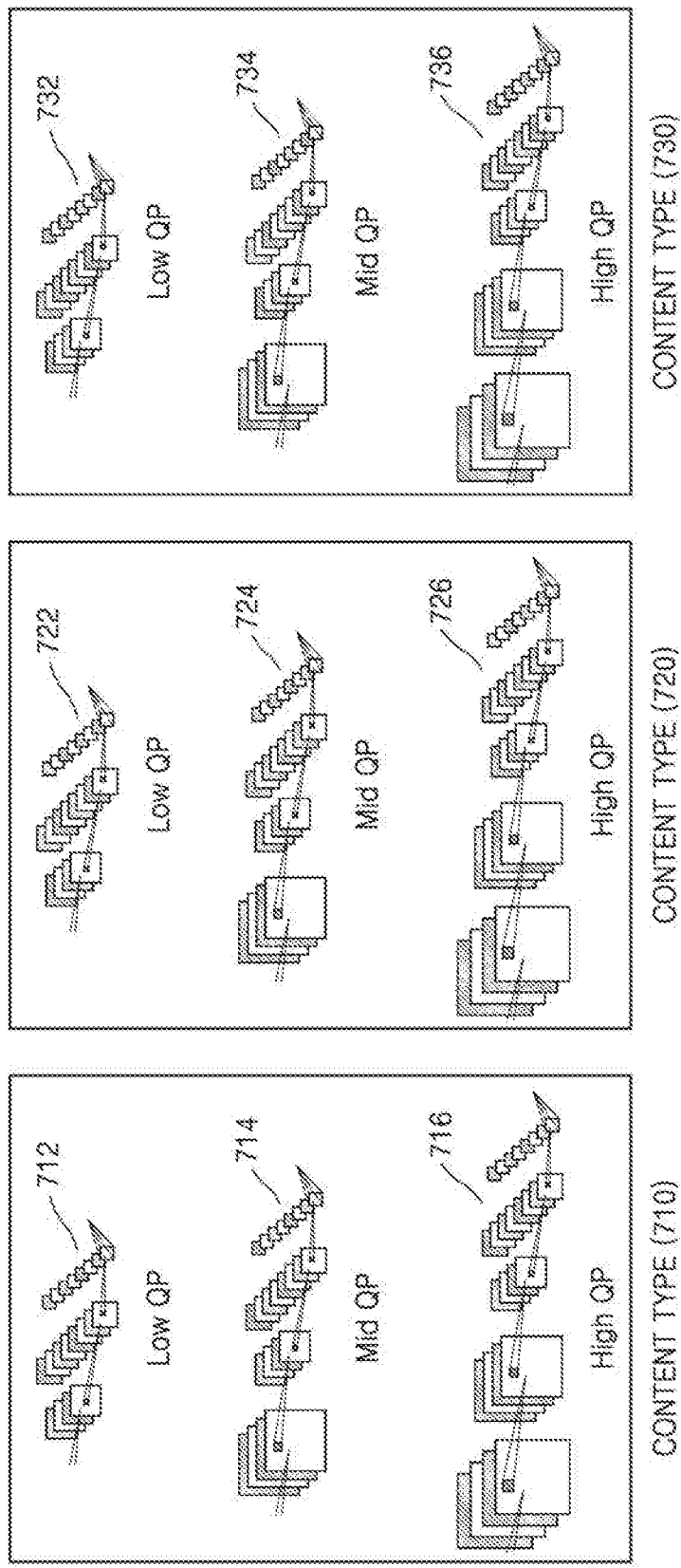
FIG. 7 is a diagram illustrating DNN filter model candidates according to an embodiment.

FIG. 7 is a diagram illustrating DNN filter model candidates according to an embodiment.

Referring to FIG. 7, DNN filter model candidates 712, 714, 716, 722, 724, 726, 732, 734, and 736 are illustrated.

The DNN filter model candidates 712, 714, 716, 722, 724, 726, 732, 734, and 736 according to an embodiment may be classified according to content types 710, 720, and 730. For example, each of the DNN filter model candidates 712, 714, 716, 722, 724, 726, 732, 734, and 736 may be trained to perform in-loop filtering on a preset content type. A type of the in-loop filtering, filtering strength, etc. may vary according to error characteristics of an image. In this case, the error characteristics of the image may vary according to a type (e.g., computer graphics, a general image, a motion blur, or a texture) of content of the image. This is because a compression ratio and a degree of subjective image quality degradation according to encoding may vary according to the content types 710, 720, and 730.

In general, the difficulty of compression of the content type may increase in an order of the computer graphics, the general image, the motion blur, and the texture. Accordingly, a network structure of a DNN filter model for processing the computer graphics may be the simplest, and a network structure of a DNN filter model for processing the texture may be the most complex. When the complexity of a network structure of a DNN filter model increases, it means that a depth of a layer constituting a network may increase or the number of masks (i.e., channels) applied to each layer may increase.

In detail, at an encoding end, a compression strength or a QP value may be determined according to the content types 710, 720, and 730 of the image. When the compression strength or the QP value increases, the number of generated bits decreases, thereby reducing image quality. In particular, when a compressed image is transmitted, a compression strength or a QP value may be determined in consideration of the number of bits per second. For example, when the number of bits per second that may be supported in a transmission channel is low, a compression ratio has to be increased by using a relatively high compression strength or QP value.

Also, because objective image quality such as a peak signal-to-noise ratio (PSNR) may not be accurate in terms of image quality considering a human visual system, image quality felt by people may vary according to the content types 710, 720, and 730. Because human eyes actually have various characteristics, image quality that is measured by using the amount of error simply in terms of signals and subjective image quality that is actually felt are different from each other. An R-D optimization model for determining an optimal QP value in terms of subjective image quality may model a brightness contrast with respect to an ambient brightness of a reference pixel. For example, even when an image is compressed by using the same compression strength or QP value, subjective image quality degradation when the content types 710, 720, and 730 of the image are textures may be greater than that when the content types 710, 720, and 730 are computer graphics.

Disclosed embodiments are based on the fact that error characteristics of an image may vary according to the content types 710, 720, and 730. The disclosed embodiments may use filter information indicating a content type (e.g., the content type 710, 720, or 730) of the image in order to effectively compensate for errors having different characteristics according to the content types 710, 720, and 730.

The in-loop filtering unit 150 or 250 according to an embodiment may include the DNN filter model candidates 712, 714, 716, 722, 724, 726, 732, 734, and 736 that are pre-trained according to the content types 710, 720, and 730. For example, the DNN filter model candidates 712, 714, 716, 722, 724, 726, 732, 734, and 736 may be preset and may be stored in the image encoding apparatus 100 or the image decoding apparatus 200. The in-loop filtering unit 150 or 250 according to an embodiment may select a DNN filter model suitable for the content types 710, 720, and 730 of a current image from among the prepared DNN filter model candidates 712, 714, 716, 722, 724, 726, 732, 734, and 736, and may perform in-loop filtering by using the selected DNN filter model. The DNN filter model candidates 712, 714, 716, 722, 724, 726, 732, 734, and 736 according to an embodiment may each have a structure trained to minimize an error between in-loop filtered reconstructed data and original data according to the content types 710, 720, and 730.

The in-loop filtering unit 150 or 250 according to an embodiment may signal filter information including information about the content types 710, 720, and 730. The in-loop filtering unit 150 or 250 may determine a DNN filter set corresponding to the content types 710, 720, and 730 indicated by the filter information from among the DNN filter model candidates 712, 714, 716, 722, 724, 726, 732, 734, and 736 according to the content types 710, 720, and 730 which are preset according to the content types 710, 720, and 730.

For example, in the case of the content type 710, the in-loop filtering unit 150 or 250 may select the DNN filter model candidates 712, 714, and 716 from among the DNN filter model candidates 712, 714, 716, 722, 724, 726, 732, 734, and 736. The in-loop filtering unit 150 or 250 may select a DNN filter model according to a QP value from among the DNN filter model candidates 712, 714, and 716, that is, from among the DNN filter set 712 applied to a low QP value, the DNN filter set 714 applied to an intermediate QP value, and the DNN filter model 716 applied to a high QP value. An embodiment of classifying DNN filter models according to a QP value will now be described.

The in-loop filtering unit 150 or 250 according to an embodiment considers that error characteristics of an image may vary according to a QP value.

A type of in-loop filtering, filtering strength, etc. may vary according to a QP value used to compress a corresponding image. Accordingly, the DNN filter model candidates 712, 714, 716, 722, 724, 726, 732, 734, and 736 according to an embodiment may be classified according to a QP value. The in-loop filtering unit 150 or 250 according to an embodiment may select a DNN filter model suitable for a QP value of a current image from among the DNN filter model candidates 712, 714, 716, 722, 724, 726, 732, 734, and 736, and may perform in-loop filtering by using the selected DNN filter model.

Filter information according to an embodiment may include information indicating a QP value in addition to information about the content types 710, 720, and 730. The in-loop filtering unit 150 or 250 may determine a DNN filter model corresponding to a QP indicated by the filter information from among the DNN filter model candidates 712, 714, 716, 722, 724, 726, 732, 734, and 736 according to QPs which are preset according to QPs. The DNN filter model candidates 712, 714, 716, 722, 724, 726, 732, 734, and 736 according to an embodiment may have a structure trained to minimize an error between in-loop filtered reconstructed data and original data, according to QPs.

For example, in the case of a low QP value, the in-loop filtering unit 150 or 250 may select the DNN filter model candidates 712, 722, and 732 from among the DNN filter model candidates 712, 714, 716, 722, 724, 726, 732, 734, and 736. In this case, when the filter information indicates the content type 710, the in-loop filtering unit 150 or 250 may select the DNN filter model 712 from among the DNN filter model candidates 712, 722, and 732, and may perform in-loop filtering by using the selected DNN filter model 712.

The filter information according to an embodiment may be determined by the image encoding apparatus 100. The image encoding apparatus 100 according to an embodiment may determine the content types 710, 720, and 730 and a QP by determining characteristics of an input image. The image encoding apparatus 100 according to an embodiment may generate a bitstream by encoding filter information including information about the content types 710, 720, and 730 and information about the QP.

The image decoding apparatus 200 according to an embodiment may obtain the filter information from the bitstream. The image decoding apparatus 200 according to an embodiment may determine a DNN filter model to be applied to in-loop filtering based on the information about the content types 710, 720, and 730 and the information about the QP included in the filter information.

The filter information according to an embodiment may be signaled after being included in a sequence parameter set, a picture parameter set, a video parameter set, a slice header, a slice segment header, or the like.

Figure 8:
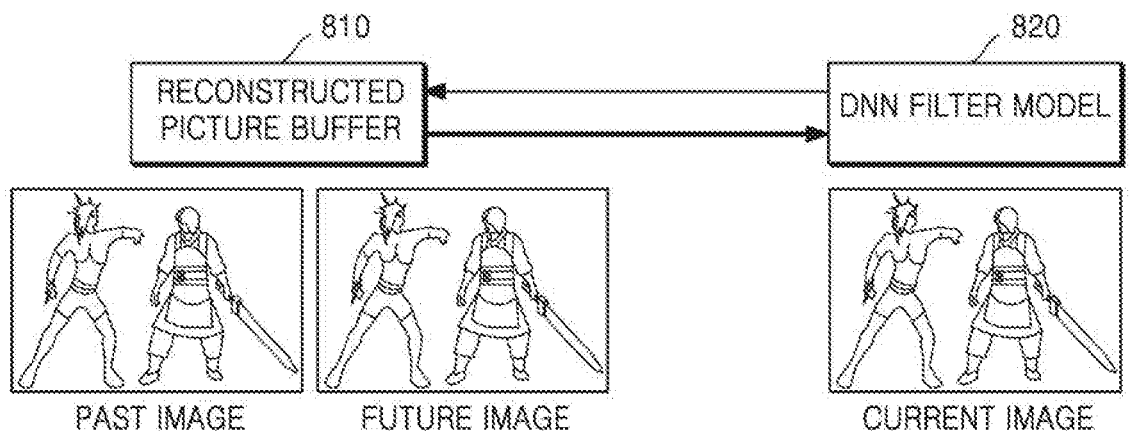
FIG. 8 is a diagram illustrating a method of performing in-loop filtering based on a DNN filter model by using at least one reference image, according to an embodiment.

FIG. 8 is a diagram illustrating a method of performing in-loop filtering based on a DNN filter model by using at least one reference image according to an embodiment.

Referring to FIG. 8, a reconstructed picture buffer 810 and a DNN filter model 820 are illustrated.

The DNN filter model 820 according to an embodiment may correspond to the in-loop filtering unit 150 or 250. Images (e.g., past images or future images) reconstructed before a current image may be stored in the reconstructed picture buffer 810 according to an embodiment to be used as reference images for inter prediction.

According to an embodiment, the DNN filter model 820 may improve the prediction accuracy of a current frame by using one or more reference images stored in the reconstructed picture buffer 810. The one or more reference images stored in the reconstructed picture buffer 810 may be input to the DNN filter model 820 according to an embodiment. The DNN filter model 820 according to an embodiment may determine one or more reference images that are referenced for in-loop filtering of reconstructed data, and may compensate for an error of the reconstructed data by referring to the one or more reference images.

The DNN filter model 820 according to an embodiment may have a structure trained to minimize an error between in-loop filtered reconstructed data and original data. The trained DNN filter model 820 has generalization ability to analyze a pattern of the input one or more reference images, find and use a feature of the pattern, and optimally filter the reconstructed data of the current image. Accordingly, the DNN filter model 820 according to an embodiment does not need to signal prediction information (e.g., a motion vector, a prediction direction, or a reference picture index) for predicting the current image through the reference images.

A network structure of the DNN filter model 820 according to an embodiment may include a set of layers including a convolution pooling layer, a hidden layer, and a fully connected layer. For example, in an overall network structure, the hidden layer may be connected to the convolution pooling layer and the fully connected layer is connected to the hidden layer.

A network structure of the DNN filter model 820 according to an embodiment is the same as that described with reference to FIG. 5, and thus a detailed explanation of a structure of a DNN will not be given.

Figure 9:
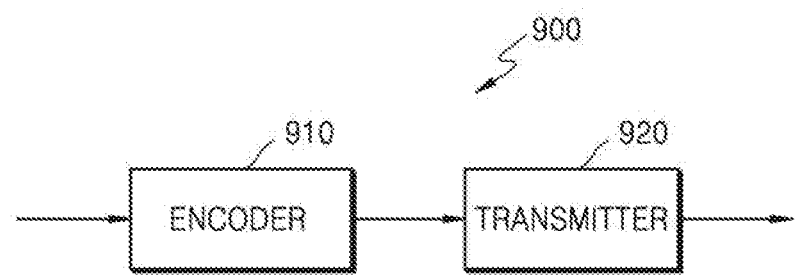
FIG. 9 is a block diagram of an image encoding apparatus 900 according to an embodiment.

FIG. 9 is a block diagram of an image encoding apparatus 900 according to an embodiment.

The image encoding apparatus 900 according to an embodiment may correspond to the image encoding apparatus 100 of FIG. 1.

Referring to FIG. 9, the image encoding apparatus 900 includes an encoder 910 and a transmitter 920.

The encoder 910 according to an embodiment may split image data of a current picture into largest coding units according to a maximum size of a coding unit. Each of the largest coding units may include blocks (i.e., coding units) split based on a block shape and a split shape. Image data in a spatial domain included in a largest coding unit according to an embodiment may be hierarchically classified according to a block shape and a split shape. A block shape of a coding unit may be a square shape, a rectangular shape, or any geometric shape, and thus is not limited to a data unit of a certain size. A block shape and a split shape of one or more blocks may be determined based on a calculated R-D cost.

The encoder 9140 according to an embodiment may determine characteristics of an input image and may determine a content type and a QP. The encoder 910 according to an embodiment may generate a bitstream by encoding filter information including information about the content type and information about the QP.

The encoder 910 according to an embodiment may generate prediction data by performing prediction on the input image based on in-loop filtered reconstructed data. The encoder 910 according to an embodiment may generate residual data by using the prediction data and data of the input image. The encoder 910 according to an embodiment may generate a quantized transform coefficient by transforming and quantizing the residual data. In this case, the quantized transform coefficient may be generated for each block. The encoder 910 according to an embodiment may output a bitstream obtained by entropy encoding the quantized transform coefficient.

According to an embodiment, the in-loop filtered reconstructed data may be generated by performing in-loop filtering based on a DNN filter model on reconstructed data reconstructed from the encoded residual data. A detailed process of in-loop filtering based on a DNN filter model according to an embodiment has been described with reference to FIGS. 4 through 8, and thus a detailed explanation thereof will not be given.

The transmitter 920 according to an embodiment transmits the bitstream output from the encoder 910 to the image decoding apparatus 200.

Figure 10:
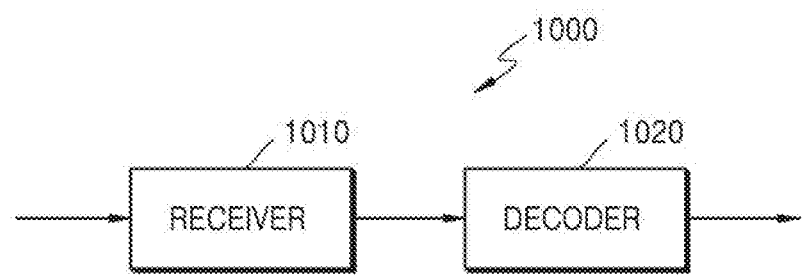
FIG. 10 is a block diagram of an image decoding apparatus 1000 according to an embodiment.

FIG. 10 is a block diagram of an image decoding apparatus 1000 according to an embodiment.

The image decoding apparatus 1000 according to an embodiment may correspond to the image decoding apparatus 200 of FIG. 2.

Referring to FIG. 10, the image decoding apparatus 1000 includes a receiver 1010 and a decoder 1020.

The receiver 1010 according to an embodiment receives an encoded bitstream.

The encoded bitstream includes a plurality of network abstraction layer (NAL) units. A NAL unit may include not only encoded sample data such as encoded slice but also high level syntax metadata such as parameter set data, slice header data, or supplemental enhancement information (SEI) data.

Parameter sets may be high level syntax structures including essential syntax elements that may be applied to multiple bitstream layers (e.g. a video parameter set (VPS)), may be applied to an encoded video sequence within one layer (e.g. a sequence parameter set (SPS)), or may be applied to a number of coded pictures within one encoded video sequence (e.g. a picture parameter set (PPS)). The parameter sets may be transmitted along with encoded pictures of the bitstream, or may be transmitted through other means including reliable channels, hard coding, out-of-band transmission, etc.

Slice header may be a high level syntax structure including picture-related information for slice or picture types.

SEI messages may carry information that may not be needed by a decoding process but may be used for various other purposes such as picture output timing or display, loss detection, and concealment.

According to an embodiment, additional information for performing in-loop filtering based on a DNN may be included in the parameter sets included in the encoded bitstream. The additional information according to an embodiment may include information (e.g., information about a filter set and the number of nodes) about a structure of a DNN filter model, and information (e.g., information about error characteristics of an encoded image, a content type of the encoded image, and information about a QP) about reconstructed data. For example, the additional information may be signaled through the VPS, the SPS, the PPS, etc. in the bitstream. The decoder 1020 according to an embodiment may obtain split information from the bitstream and may hierarchically split image data of a spatial region according to a block shape and a split shape. When blocks used for decoding have a certain shape and a certain size, the decoder 1020 may split the image data without using the split information.

According to an embodiment, the decoder 1020 obtains residual data of each block by inverse quantizing and inverse transforming a quantized transform coefficient obtained by entropy decoding the bitstream. Next, the decoder 1020 reconstructs an image by using prediction data of each block generated by the predictor 1530 and the residual data of each block.

According to an embodiment, the decoder 1020 performs in-loop filtering on reconstructed data generated by reconstructing the image. In this case, an in-loop filtering operation performed by the decoder 1020 may be based on the DNN filter model.

According to an embodiment, the decoder 1020 may obtain filter information about the reconstructed data from the bitstream. The decoder 1020 selects a DNN filter model for compensating for an error of the reconstructed data from among preset DNN filter model candidates for in-loop filtering, based on the filter information. The decoder 1020 may perform in-loop filtering based on the DNN filter model on the reconstructed data by using the selected DNN filter model.

Although the filter information about the reconstructed data may be transmitted through the bitstream, the filter information may be pre-shared between the image encoding apparatus 100 and the image decoding apparatus 200. Also, the filter information about the reconstructed data may be shared through a separate server that may communicate.

According to an embodiment, the decoder 1020 may perform in-loop filtering based on a DNN trained to generate data with a smallest error between original data and filtered reconstructed data. In this case, signaling of information about DF, and information about ALF and SAO parameters described with reference to FIG. 3 is not required. This is because the trained DNN filter model has generalization ability to analyze an input pattern, find a feature of the input pattern, and perform optimal filtering. A detailed process of in-loop filtering based on a DNN filter model according to an embodiment has been described with reference to FIGS. 4 through 8, and thus a detailed explanation thereof will not be given.

Figure 11:
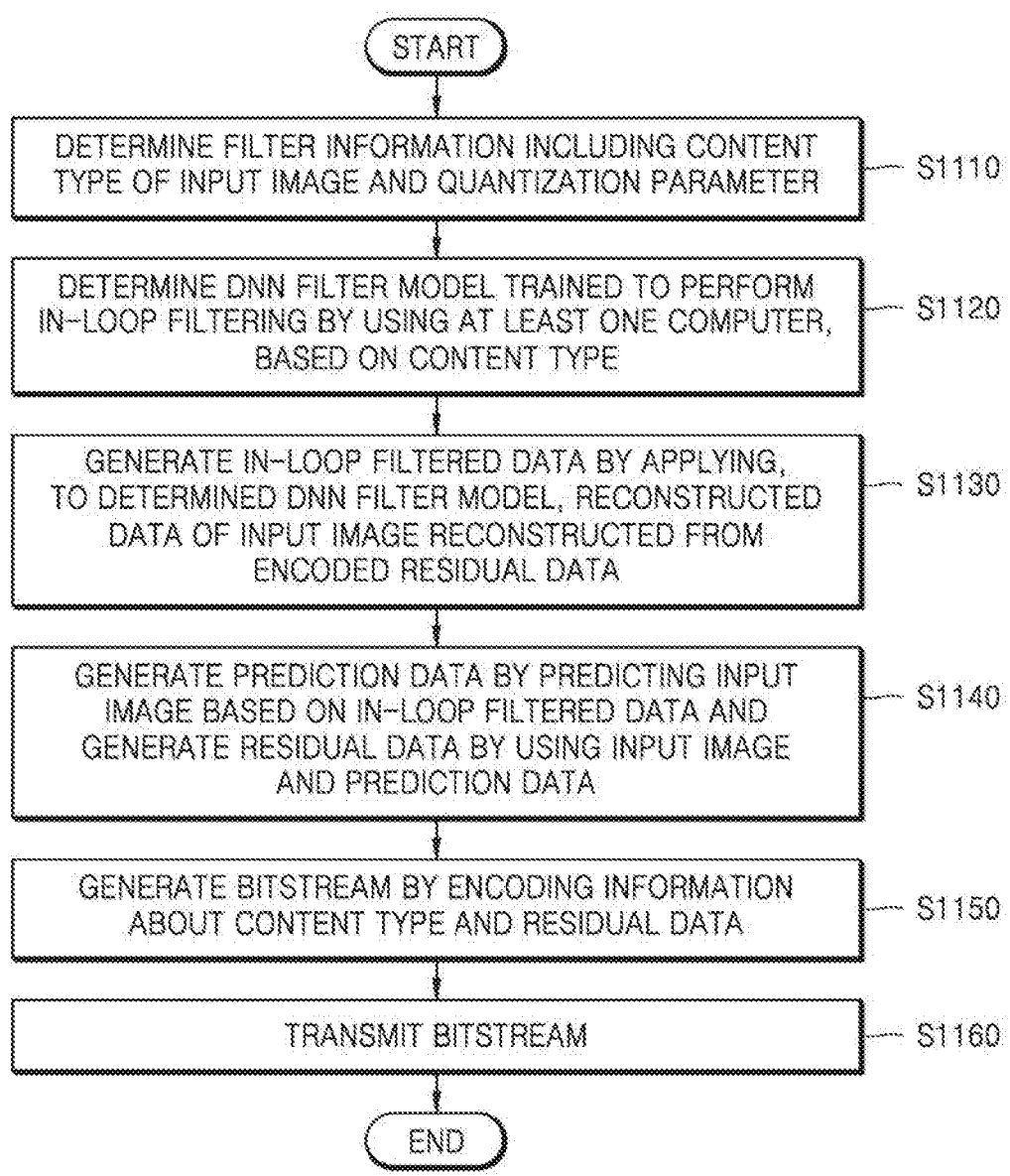
FIG. 11 is a flowchart illustrating an image encoding method including an in-loop filtering process based on a DNN filter model, according to an embodiment.

FIG. 11 is a flowchart illustrating an image encoding method including an in-loop filtering process based on a DNN filter model according to an embodiment.

In operation S1110, the image encoding apparatus 100 determines a content type of an input image.

In operation S1120, the image encoding apparatus 100 determines a DNN filter model trained to perform in-loop filtering by using at least one computer, based on the content type.

In operation S1130, the image encoding apparatus 100 generates in-loop filtered data by applying, to the determined DNN filter model, reconstructed data of the input image reconstructed from encoded residual data.

In operation S1140, the image encoding apparatus 100 generates prediction data that predicts the input image based on the in-loop filtered data, and generates residual data by using the input image and the prediction data.

In operation S1150, the image encoding apparatus 100 generates a bitstream by encoding the residual data and information about the content type.

In operation S1160, the generated bitstream is transmitted.

Figure 12:
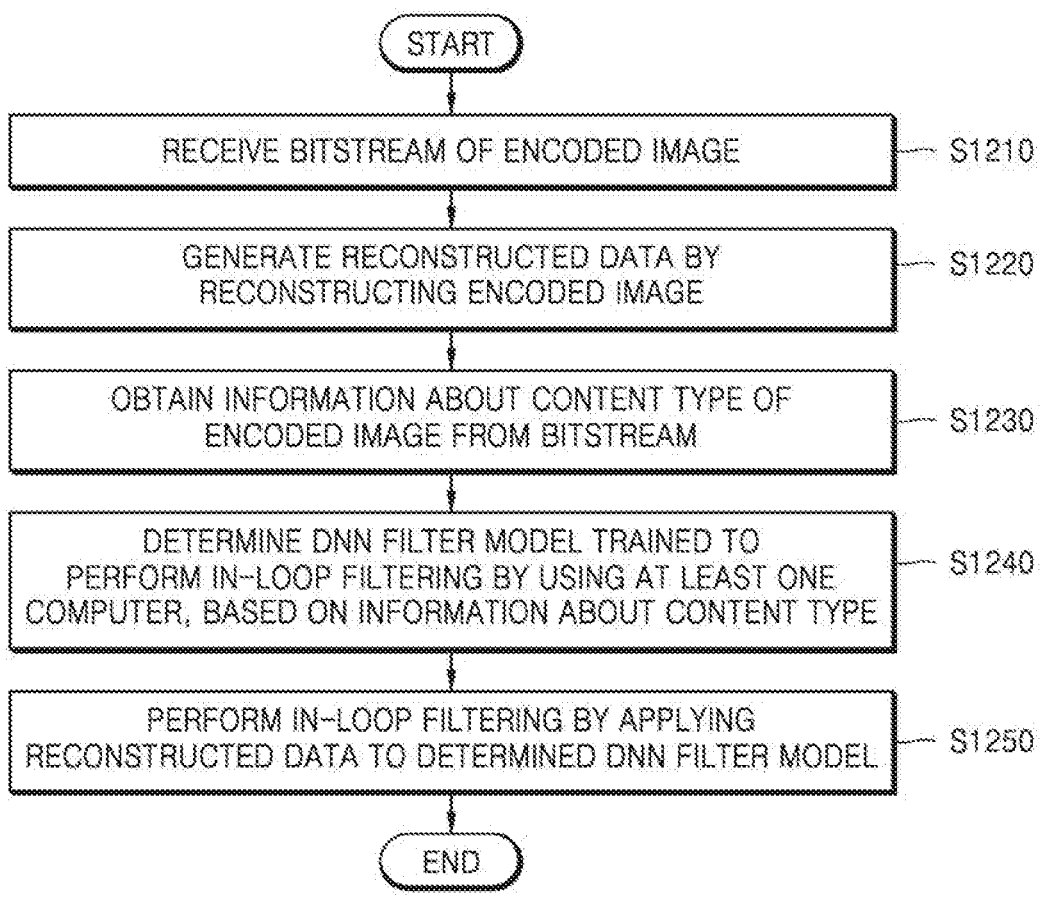
FIG. 12 is a flowchart illustrating an image decoding method including an in-loop filtering process based on a DNN filter model, according to an embodiment.

FIG. 12 is a flowchart illustrating an image decoding method including an in-loop filtering process based on a DNN filter model according to an embodiment.

In operation S1210, the image decoding apparatus 200 receives a bitstream of an encoded image.

In operation S1220, the image decoding apparatus 200 generates reconstructed data by reconstructing the encoded image.

In operation S1230, the image decoding apparatus 200 obtains information about a content type of the encoded image from the bitstream.

In operation S1240, the image decoding apparatus 200 determines a DNN filter model trained to perform in-loop filtering by using at least one computer, based on the information about the content type.

In operation S1250, the image decoding apparatus 200 performs in-loop filtering by applying the reconstructed data to the determined DNN filter model.

A method of determining a data unit of an image according to an embodiment will now be described with reference to FIGS. 13 through 26. A method of splitting a coding unit described with reference to FIGS. 13 through 26 may also be applied to a method of splitting a transform unit that is a criterion of transformation.

Figure 13:
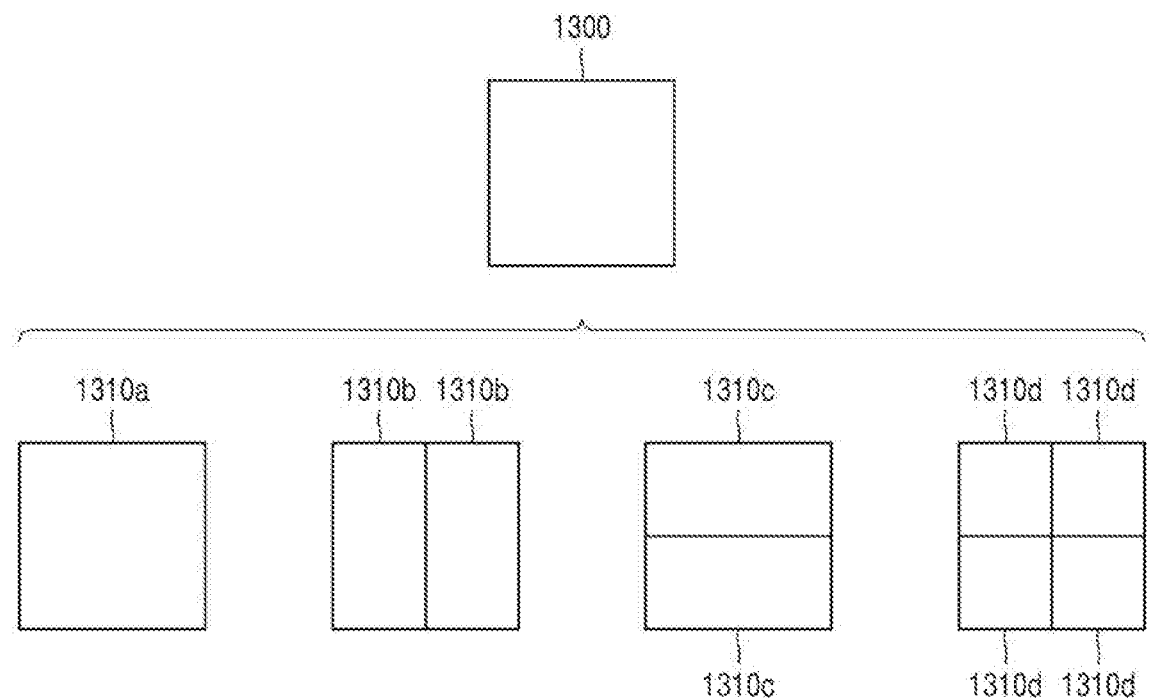
FIG. 13 illustrates a process of determining at least one coding unit by splitting a current coding, according to an embodiment.

FIG. 13 illustrates a process, performed by the image decoding apparatus 200, of determining at least one coding unit by splitting a current coding unit, according to an embodiment.

According to an embodiment, the image decoding apparatus 200 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 200.

According to an embodiment, the image decoding apparatus 200 may use the block shape information indicating that the current coding unit has a square shape. For example, the image decoding apparatus 200 may determine whether not to split a square coding unit, whether to vertically split the square coding unit, whether to horizontally split the square coding unit, or whether to split the square coding unit into four coding units, based on the split shape information. Referring to FIG. 13, when the block shape information of a current coding unit 1300 indicates a square shape, the image decoding apparatus 200 may determine that a coding unit 1310a having the same size as the current coding unit 1300 is not split, based on the split shape information indicating not to perform splitting, or may determine coding units 1310b, 1310c, or 1310d split based on the split shape information indicating a predetermined splitting method.

Referring to FIG. 13, according to an embodiment, the image decoding apparatus 200 may determine two coding units 1310b obtained by splitting the current coding unit 1300 in a vertical direction, based on the split shape information indicating to perform splitting in a vertical direction. The image decoding apparatus 200 may determine two coding units 1310c obtained by splitting the current coding unit 1300 in a horizontal direction, based on the split shape information indicating to perform splitting in a horizontal direction. The image decoding apparatus 200 may determine four coding units 1310d obtained by splitting the current coding unit 1300 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

Figure 14:
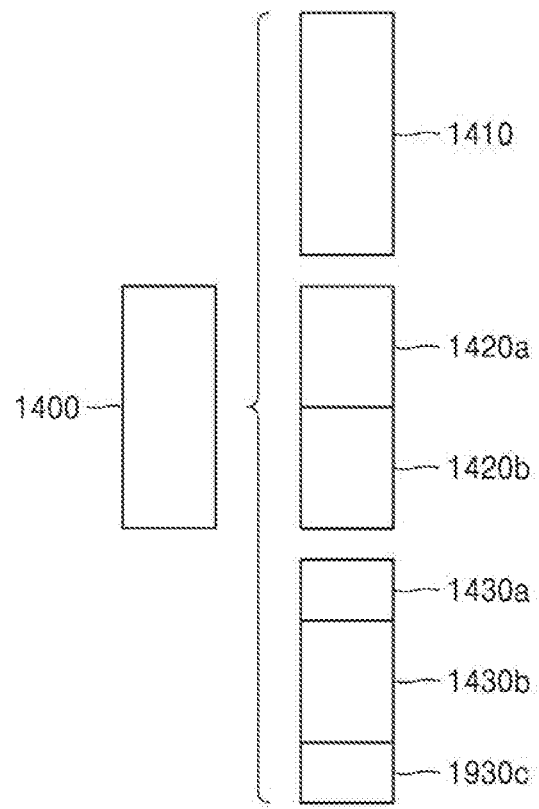
FIG. 14 illustrates a process of determining at least one coding unit by splitting a non-square coding unit, according to an embodiment.
Figure 14:
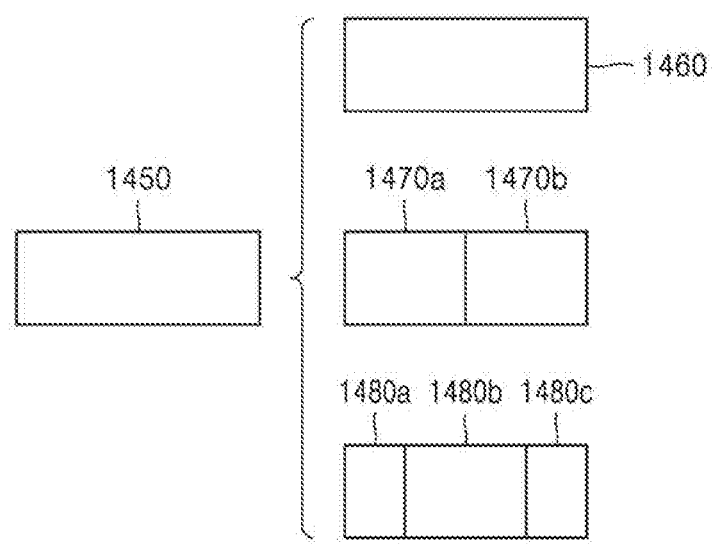

FIG. 14 illustrates a process, performed by the image decoding apparatus 200, of determining at least one coding unit by splitting a non-square coding unit, according to an embodiment.

According to an embodiment, the image decoding apparatus 200 may use block shape information indicating that a current coding unit has a non-square shape. The image decoding apparatus 200 may determine whether not to split the non-square current coding unit or whether to split the non-square current coding unit by using a predetermined splitting method, based on split shape information. Referring to FIG. 14, when the block shape information of a current coding unit 1400 or 1450 indicates a non-square shape, the image decoding apparatus 200 may determine that a coding unit 1410 or 1460 having the same size as the current coding unit 1400 or 1450 is not split, based on the split shape information indicating not to perform splitting, or determine coding units 1420a and 1420b, 1430a to 1430c, 1470a and 1470b, or 1480a to 1480c split based on the split shape information indicating a predetermined splitting method.

Predetermined splitting methods of splitting a non-square coding unit will be described in detail below in relation to various embodiments.

According to an embodiment, the image decoding apparatus 200 may determine a splitting method of a coding unit by using the split shape information and, in this case, the split shape information may indicate the number of one or more coding units generated by splitting a coding unit. Referring to FIG. 14, when the split shape information indicates to split the current coding unit 1400 or 1450 into two coding units, the image decoding apparatus 200 may determine two coding units 1420*a* and 1420*b*, or 1470*a* and 1470*b* included in the current coding unit 1400 or 1450, by splitting the current coding unit 1400 or 1450 based on the split shape information.

According to an embodiment, when the image decoding apparatus 200 splits the non-square current coding unit 1400 or 1450 based on the split shape information, the location of a long side of the non-square current coding unit 1400 or 1450 may be considered. For example, the image decoding apparatus 200 may determine a plurality of coding units by dividing a long side of the current coding unit 1400 or 1450, in consideration of the shape of the current coding unit 1400 or 1450.

According to an embodiment, when the split shape information indicates to split a coding unit into an odd number of blocks, the image decoding apparatus 200 may determine an odd number of coding units included in the current coding unit 1400 or 1450. For example, when the split shape information indicates to split the current coding unit 1400 or 1450 into three coding units, the image decoding apparatus 200 may split the current coding unit 1400 or 1450 into three coding units 1430*a*, 1430*b*, and 1430*c*, or 1480*a*, 1480*b*, and 1480*c*. According to an embodiment, the image decoding apparatus 200 may determine an odd number of coding units included in the current coding unit 1400 or 1450, and not all the determined coding units may have the same size. For example, a predetermined coding unit 1430*b* or 1480*b* from among the determined odd number of coding units 1430*a*, 1430*b*, and 1430*c*, or 1480*a*, 1480*b*, and 1480*c* may have a size different from the size of the other coding units 1430*a* and 1430*c*, or 1480*a* and 1480*c*. That is, coding units which may be determined by splitting the current coding unit 1400 or 1450 may have multiple sizes and, in some cases, all of the odd number of coding units 1430*a*, 1430*b*, and 1430*c*, or 1480*a*, 1480*b*, and 1480*c* may have different sizes.

According to an embodiment, when the split shape information indicates to split a coding unit into an odd number of blocks, the image decoding apparatus 200 may determine an odd number of coding units included in the current coding unit 1400 or 1450, and may put a predetermined restriction on at least one coding unit from among the odd number of coding units generated by splitting the current coding unit 1400 or 1450. Referring to FIG. 14, the image decoding apparatus 200 may allow a decoding method of the coding unit 1430*b* or 1480*b* to be different from that of the other coding units 1430*a* and 1430*c*, or 1480*a* and 1480*c*, wherein the coding unit 1430*b* or 1480*b* is at a center location from among the three coding units 1430*a*, 1430*b*, and 1430*c*, or 1480*a*, 1480*b*, and 1480*c* generated by splitting the current coding unit 1400 or 1450. For example, the image decoding apparatus 200 may restrict the coding unit 1430*b* or 1480*b* at the center location to be no longer split or to be split only a predetermined number of times, unlike the other coding units 1430*a* and 1430*c*, or 1480*a* and 1480*c*.

Figure 15:
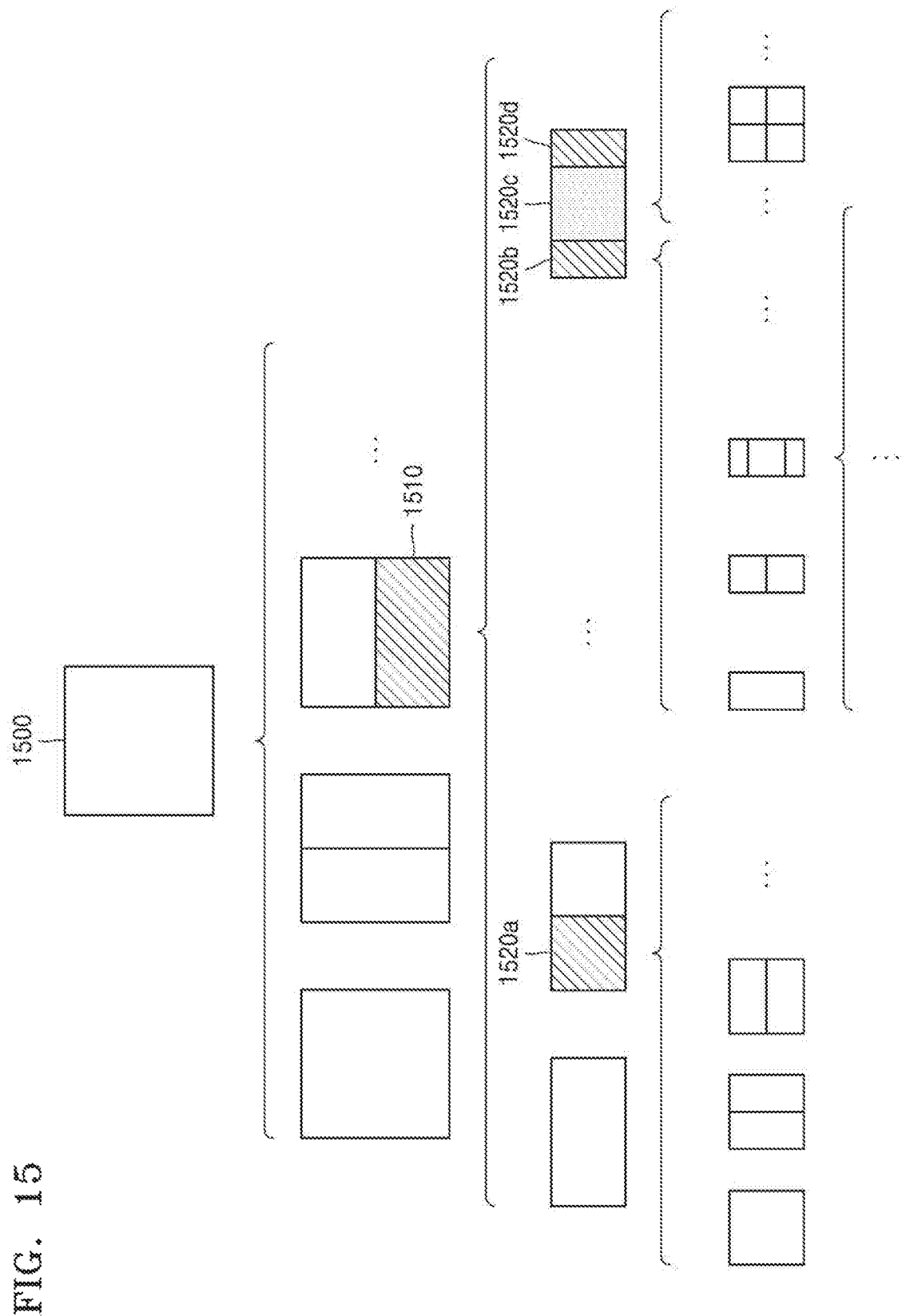
FIG. 15 illustrates a process of splitting a coding unit based on at least one of block shape information and split shape information, according to an embodiment.

FIG. 15 illustrates a process, performed by the image decoding apparatus 200, of splitting a coding unit based on at least one of block shape information and split shape information, according to an embodiment.

According to an embodiment, the image decoding apparatus 200 may determine to split or not to split a square first coding unit 1500 into coding units, based on at least one of the block shape information and the split shape information. According to an embodiment, when the split shape information indicates to split the first coding unit 1500 in a horizontal direction, the image decoding apparatus 200 may determine a second coding unit 1510 by splitting the first coding unit 1500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 200 may determine to split or not to split the determined second coding unit 1510 into coding units, based on at least one of the block shape information and the split shape information. Referring to FIG. 15, the image decoding apparatus 200 may or may not split the non-square second coding unit 1510, which is determined by splitting the first coding unit 1500, into one or more third coding units 1520*a*, or 1520*b*, 1520*c*, and 1520*d* based on at least one of the block shape information and the split shape information. The image decoding apparatus 200 may obtain at least one of the block shape information and the split shape information, and determine a plurality of various-shaped second coding units (e.g., 1510) by splitting the first coding unit 1500, based on the obtained at least one of the block shape information and the split shape information, and the second coding unit 1510 may be split by using the splitting method of the first coding unit 1500, based on at least one of the block shape information and the split shape information. According to an embodiment, when the first coding unit 1500 is split into the second coding units 1510 based on at least one of the block shape information and the split shape information of the first coding unit 1500, the second coding unit 1510 may also be split into the third coding units 1520*a*, or 1520*b*, 1520*c*, and 1520*d* based on at least one of the block shape information and the split shape information of the second coding unit 1510. That is, a coding unit may be recursively split based on at least one of the block shape information and the split shape information of each coding unit. Therefore, a square coding unit may be determined by splitting a non-square coding unit, and a non-square coding unit may be determined by recursively splitting the square coding unit. Referring to FIG. 15, a predetermined coding unit from among an odd number of third coding units 1520*b*, 1520*c*, and 1520*d* determined by splitting the non-square second coding unit 1510 (e.g., a coding unit at a center location or a square coding unit) may be recursively split. According to an embodiment, the square third coding unit 1520*c* from among the odd number of third coding units 1520*b*, 1520*c*, and 1520*d* may be split in a horizontal direction into a plurality of fourth coding units.

A method that may be used to recursively split a coding unit will be described below in relation to various embodiments.

According to an embodiment, the image decoding apparatus 200 may determine to split each of the third coding units 1520*a*, or 1520*b*, 1520*c*, and 1520*d* into coding units or not to split the second coding unit 1510, based on at least one of the block shape information and the split shape information. According to an embodiment, the image decoding apparatus 200 may split the non-square second coding unit 1510 into the odd number of third coding units 1520*b*, 1520*c*, and 1520*d*. The image decoding apparatus 200 may put a predetermined restriction on a predetermined third coding unit from among the odd number of third coding units 1520*b*, 1520*c*, and 1520*d*. For example, the image decoding apparatus 200 may restrict the third coding unit 1520*c* at a center location from among the odd number of third coding units 1520*b*, 1520*c*, and 1520*d* to be no longer split or to be split a settable number of times. Referring to FIG. 15, the image decoding apparatus 200 may restrict the third coding unit 1520*c*, which is at the center location from among the odd number of third coding units 1520*b*, 1520*c*, and 1520*d* included in the non-square second coding unit 1510, to be no longer split, to be split by using a predetermined splitting method (e.g., split into only four coding units or split by using a splitting method of the second coding unit 1510), or to be split only a predetermined number of times (e.g., split only n times (where n>0)). However, the restrictions on the third coding unit 1520*c* at the center location are not limited to the above-described examples, and may include various restrictions for decoding the third coding unit 1520*c* at the center location differently from the other third coding units 1520*b* and 1520*d*.

According to an embodiment, the image decoding apparatus 200 may obtain at least one of the block shape information and the split shape information, which is used to split a current coding unit, from a predetermined location in the current coding unit.

Figure 16:
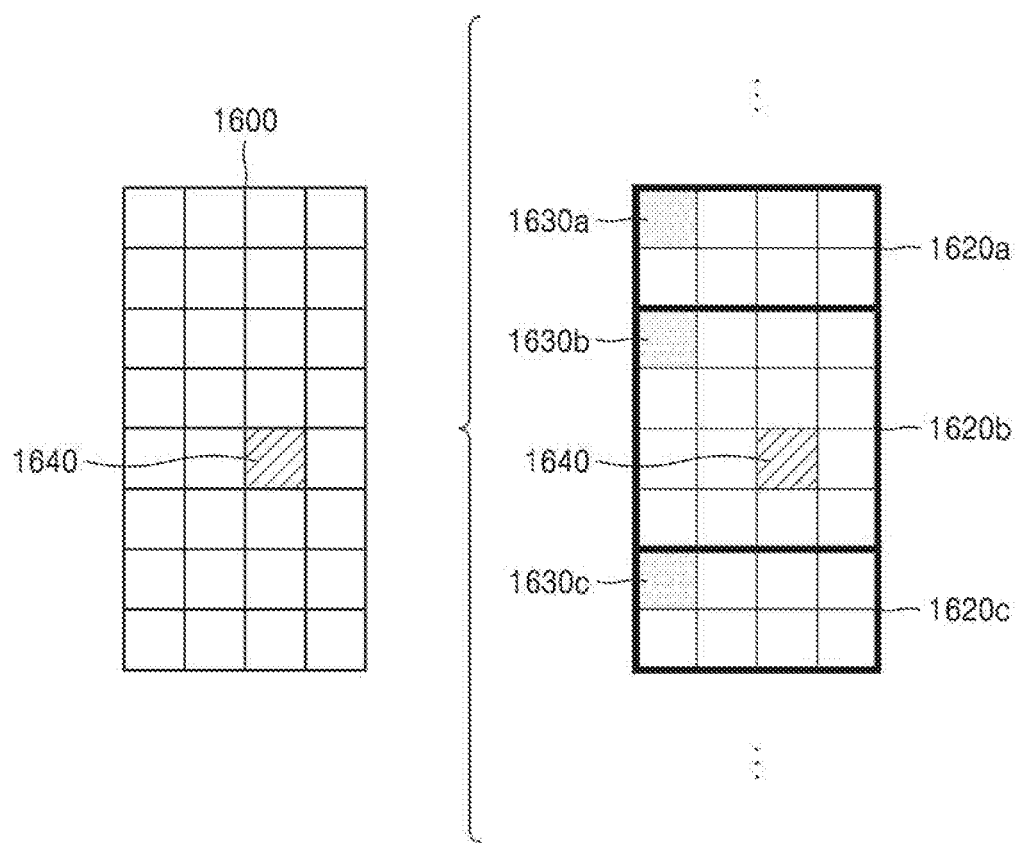
FIG. 16 illustrates a method of determining a predetermined coding unit from among an odd number of coding units, according to an embodiment.

FIG. 16 illustrates a method, performed by the image decoding apparatus 200, of determining a predetermined coding unit from among an odd number of coding units, according to an embodiment. Referring to FIG. 16, at least one of block shape information and split shape information of a current coding unit 1600 may be obtained from a sample of a predetermined location from among a plurality of samples included in the current coding unit 1600 (e.g., a sample 1640 of a center location). However, the predetermined location in the current coding unit 1600, from which at least one of the block shape information and the split shape information may be obtained, is not limited to the center location in FIG. 16, and may include various locations included in the current coding unit 1600 (e.g., top, bottom, left, right, top left, bottom left, top right, and bottom right locations). The image decoding apparatus 200 may obtain at least one of the block shape information and the split shape information from the predetermined location and determine to split or not to split the current coding unit into various-shaped and various-sized coding units.

According to an embodiment, when the current coding unit is split into a predetermined number of coding units, the image decoding apparatus 200 may select one of the coding units. Various methods may be used to select one of a plurality of coding units, as will be described below in relation to various embodiments.

According to an embodiment, the image decoding apparatus 200 may split the current coding unit into a plurality of coding units, and may determine a coding unit at a predetermined location.

FIG. 16 illustrates a method, performed by the image decoding apparatus 200, of determining a coding unit of a predetermined location from among an odd number of coding units, according to an embodiment.

According to an embodiment, the image decoding apparatus 200 may use information indicating locations of the odd number of coding units, to determine a coding unit at a center location from among the odd number of coding units. Referring to FIG. 16, the image decoding apparatus 200 may determine an odd number of coding units 1620*a*, 1620*b*, and 1620*c* by splitting the current coding unit 1600. The image decoding apparatus 200 may determine a coding unit 1620*b* at a center location by using information about locations of the odd number of coding units 1620*a* to 1620*c*. For example, the image decoding apparatus 200 may determine the coding unit 1620*b* of the center location by determining the locations of the coding units 1620*a*, 1620*b*, and 1620*c* based on information indicating locations of predetermined samples included in the coding units 1620*a*, 1620*b*, and 1620*c*. In detail, the image decoding apparatus 200 may determine the coding unit 1620*b* at the center location by determining the locations of the coding units 1620*a*, 1620*b*, and 1620*c* based on information indicating locations of top left samples 1630*a*, 1630*b*, and 1630*c* of the coding units 1620*a*, 1620*b*, and 1620*c*.

According to an embodiment, the information indicating the locations of the top left samples 1630*a*, 1630*b*, and 1630*c*, which are included in the coding units 1620*a*, 1620*b*, and 1620*c*, respectively, may include information about locations or coordinates of the coding units 1620*a*, 1620*b*, and 1620*c* in a picture. According to an embodiment, the information indicating the locations of the top left samples 1630*a*, 1630*b*, and 1630*c*, which are included in the coding units 1620*a*, 1620*b*, and 1620*c*, respectively, may include information indicating widths or heights of the coding units 1620*a*, 1620*b*, and 1620*c* included in the current coding unit 1600, and the widths or heights may correspond to information indicating differences between the coordinates of the coding units 1620*a*, 1620*b*, and 1620*c* in the picture. That is, the image decoding apparatus 200 may determine the coding unit 1620*b* at the center location by directly using the information about the locations or coordinates of the coding units 1620*a*, 1620*b*, and 1620*c* in the picture, or by using the information about the widths or heights of the coding units, which correspond to the difference values between the coordinates.

According to an embodiment, information indicating the location of the top left sample 1630*a* of the upper coding unit 1620*a* may include coordinates (xa, ya), information indicating the location of the top left sample 1630*b* of the middle coding unit 1620*b* may include coordinates (xb, yb), and information indicating the location of the top left sample 1630*c* of the lower coding unit 1620*c* may include coordinates (xc, yc). The image decoding apparatus 200 may determine the middle coding unit 1620*b* by using the coordinates of the top left samples 1630*a*, 1630*b*, and 1630*c* which are included in the coding units 1620*a*, 1620*b*, and 1620*c*, respectively. For example, when the coordinates of the top left samples 1630*a*, 1630*b*, and 1630*c* are sorted in an ascending or descending order, the coding unit 1620*b* including the coordinates (xb, yb) of the sample 1630*b* at a center location may be determined as a coding unit at a center location from among the coding units 1620*a*, 1620*b*, and 1620*c* determined by splitting the current coding unit 1600. However, the coordinates indicating the locations of the top left samples 1630*a*, 1630*b*, and 1630*c* may include coordinates indicating absolute locations in the picture, or may use coordinates (dxb, dyb) indicating a relative location of the top left sample 1630*b* of the middle coding unit 1620*b* and coordinates (dxc, dyc) indicating a relative location of the top left sample 1630*c* of the lower coding unit 1620*c* with reference to the location of the top left sample 1630*a* of the upper coding unit 1620*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 200 may split the current coding unit 1600 into a plurality of coding units 1620a, 1620b, and 1620c, and may select one of the coding units 1620a, 1620b, and 1620c based on a predetermined criterion. For example, the image decoding apparatus 200 may select the coding unit 1620b, which has a size different from that of the others, from among the coding units 1620a, 1620b, and 1620c.

According to an embodiment, the image decoding apparatus 200 may determine the widths or heights of the coding units 1620a, 1620b, and 1620c by using the coordinates (xa, ya) indicating the location of the top left sample 1630a of the upper coding unit 1620a, the coordinates (xb, yb) indicating the location of the top left sample 1630b of the middle coding unit 1620b, and the coordinates (xc, yc) indicating the location of the top left sample 1630c of the lower coding unit 1620c. The image decoding apparatus 200 may determine the respective sizes of the coding units 1620a, 1620b, and 1620c by using the coordinates (xa, ya), (xb, yb), and (xc, yc) indicating the locations of the coding units 1620a, 1620b, and 1620c.

According to an embodiment, the image decoding apparatus 200 may determine the width of the upper coding unit 1620a to be xb-xa and determine the height thereof to be yb-ya. According to an embodiment, the image decoding apparatus 200 may determine the width of the middle coding unit 1620b to be xc-xb and determine the height thereof to be yc-yb. According to an embodiment, the image decoding apparatus 200 may determine the width or height of the lower coding unit 1620c by using the width or height of the current coding unit 1600 or the widths or heights of the upper and middle coding units 1620a and 1620b. The image decoding apparatus 200 may determine a coding unit, which has a size different from that of the others, based on the determined widths and heights of the coding units 1620a to 1620c. Referring to FIG. 16, the image decoding apparatus 200 may determine the middle coding unit 1620b, which has a size different from the size of the upper and lower coding units 1620a and 1620c, as the coding unit of the predetermined location. However, the above-described method, performed by the image decoding apparatus 200, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 200 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 200 may determine the coding unit at the predetermined location in a horizontal direction. That is, the image decoding apparatus 200 may determine one of coding units at different locations in a horizontal direction and put a restriction on the coding unit. When the current coding unit has a non-square shape, a height of which is longer than a width, the image decoding apparatus 200 may determine the coding unit at the predetermined location in a vertical direction. That is, the image decoding apparatus 200 may determine one of coding units at different locations in a vertical direction and may put a restriction on the coding unit.

According to an embodiment, the image decoding apparatus 200 may use information indicating respective locations of an even number of coding units, to determine the coding unit at the predetermined location from among the even number of coding units. The image decoding apparatus 200 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 16, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 200 may use at least one of block shape information and split shape information, which is stored in a sample included in a coding unit at a center location, in a splitting operation to determine the coding unit at the center location from among the plurality of coding units determined by splitting the current coding unit.

Referring to FIG. 16, the image decoding apparatus 200 may split the current coding unit 1600 into a plurality of coding units 1620a, 1620b, and 1620c based on at least one of the block shape information and the split shape information, and may determine a coding unit 1620b at a center location from among the plurality of the coding units 1620a, 1620b, and 1620c. Furthermore, the image decoding apparatus 200 may determine the coding unit 1620b at the center location, in consideration of a location from which at least one of the block shape information and the split shape information is obtained. That is, at least one of the block shape information and the split shape information of the current coding unit 1600 may be obtained from the sample 1640 at a center location of the current coding unit 1600 and, when the current coding unit 1600 is split into the plurality of coding units 1620a, 1620b, and 1620c based on at least one of the block shape information and the split shape information, the coding unit 1620b including the sample 1640 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 16, the image decoding apparatus 200 may use at least one of the block shape information and the split shape information, which is obtained from a sample at a predetermined location in the current coding unit 1600 (e.g., a sample at a center location of the current coding unit 1600) to determine a coding unit at a predetermined location from among the plurality of the coding units 1620*a*, 1620*b*, and 1620*c* determined by splitting the current coding unit 1600 (e.g., a coding unit at a center location from among a plurality of split coding units). That is, the image decoding apparatus 200 may determine the sample at the predetermined location by considering a block shape of the current coding unit 1600, determine the coding unit 1620*b* including a sample, from which predetermined information (e.g., at least one of the block shape information and the split shape information) may be obtained, from among the plurality of coding units 1620*a*, 1620*b*, and 1620*c* determined by splitting the current coding unit 1600, and may put a predetermined restriction on the coding unit 1620*b*. Referring to FIG. 16, according to an embodiment, the image decoding apparatus 200 may determine the sample 1640 at the center location of the current coding unit 1600 as the sample from which the predetermined information may be obtained, and may put a predetermined restriction on the coding unit 1620*b* including the sample 1640, in a decoding operation. However, the location of the sample from which the predetermined information may be obtained is not limited to the above-described location, and may include arbitrary locations of samples included in the coding unit 1620*b* to be determined for a restriction.

According to an embodiment, the location of the sample from which the predetermined information may be obtained may be determined based on the shape of the current coding unit 1600. According to an embodiment, the block shape information may indicate whether the current coding unit has a square or non-square shape, and the location of the sample from which the predetermined information may be obtained may be determined based on the shape. For example, the image decoding apparatus 200 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 200 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 200 may use at least one of the block shape information and the split shape information to determine a coding unit at a predetermined location from among the plurality of coding units. According to an embodiment, the image decoding apparatus 200 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 15, and thus detailed descriptions thereof will not be provided here.

According to an embodiment, the image decoding apparatus 200 may determine one or more coding units by splitting the current coding unit, and may determine an order of decoding the one or more coding units, based on a predetermined block (e.g., the current coding unit).

Figure 17:
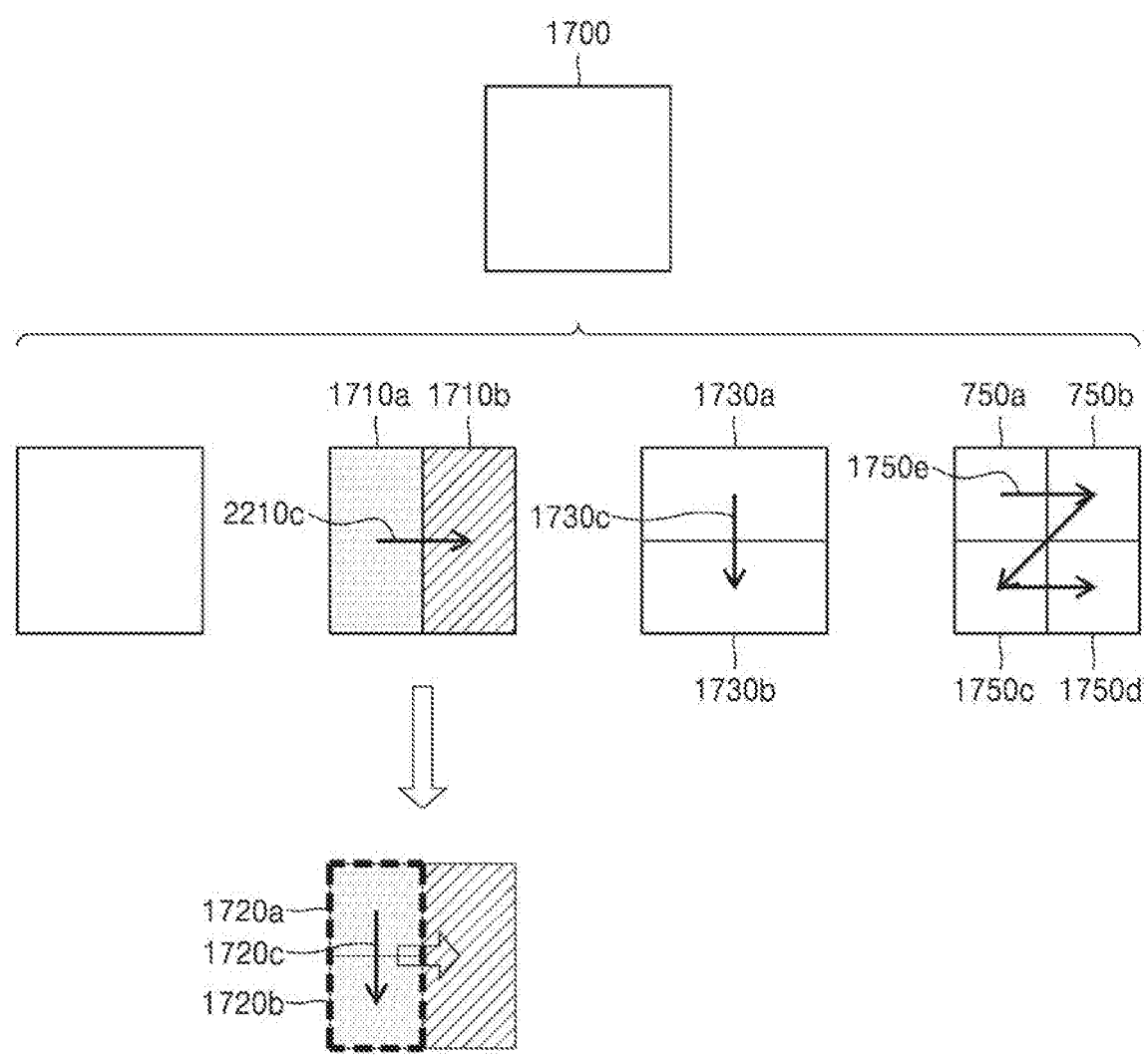
FIG. 17 illustrates an order of processing a plurality of coding units when the plurality of coding units are determined by splitting a current coding unit, according to an embodiment.

FIG. 17 illustrates an order of processing a plurality of coding units when the image decoding apparatus 200 determines the plurality of coding units by splitting a current coding unit, according to an embodiment.

According to an embodiment, the image decoding apparatus 200 may determine second coding units 1710*a* and 1710*b* by splitting a first coding unit 1700 in a vertical direction, determine second coding units 1730*a* and 1730*b* by splitting the first coding unit 1700 in a horizontal direction, or determine second coding units 1750*a* to 1750*d* by splitting the first coding unit 1700 in vertical and horizontal directions, based on block shape information and split shape information.

Referring to FIG. 17, the image decoding apparatus 200 may determine to process the second coding units 1710*a* and 1710*b*, which are determined by splitting the first coding unit 1700 in a vertical direction, in a horizontal direction order 1710*c*. The image decoding apparatus 200 may determine to process the second coding units 1730*a* and 1730*b*, which are determined by splitting the first coding unit 1700 in a horizontal direction, in a vertical direction order 1730*c*. The image decoding apparatus 200 may determine to process the second coding units 1750*a* to 1750*d*, which are determined by splitting the first coding unit 1700 in vertical and horizontal directions, in a predetermined order for processing coding units in a row and then processing coding units in a next row (e.g., in a raster scan order or Z-scan order 1750*e*).

According to an embodiment, the image decoding apparatus 200 may recursively split coding units. Referring to FIG. 17, the image decoding apparatus 200 may determine a plurality of coding units 1710*a*, 1710*b*, 1730*a*, 1730*b*, 1750*a*, 1750*b*, 1750*c*, and 1750*d* by splitting the first coding unit 1700, and may recursively split each of the determined plurality of coding units 1710*a*, 1710*b*, 1730*a*, 1730*b*, 1750*a*, 1750*b*, 1750*c*, and 1750*d*. A splitting method of the plurality of coding units 1710*a*, 1710*b*, 1730*a*, 1730*b*, 1750*a*, 1750*b*, 1750*c*, and 1750*d* may correspond to a splitting method of the first coding unit 1700. As such, each of the plurality of coding units 1710*a*, 1710*b*, 1730*a*, 1730*b*, 1750*a*, 1750*b*, 1750*c*, and 1750*d* may be independently split into a plurality of coding units. Referring to FIG. 17, the image decoding apparatus 200 may determine the second coding units 1710*a* and 1710*b* by splitting the first coding unit 1700 in a vertical direction, and may determine to independently split or not to split each of the second coding units 1710*a* and 1710*b*.

According to an embodiment, the image decoding apparatus 200 may determine third coding units 1720*a* and 1720*b* by splitting the left second coding unit 1710*a* in a horizontal direction, and may not split the right second coding unit 1710*b*.

According to an embodiment, a processing order of coding units may be determined based on an operation of splitting a coding unit. In other words, a processing order of split coding units may be determined based on a processing order of coding units immediately before being split. The image decoding apparatus 200 may determine a processing order of the third coding units 1720a and 1720b determined by splitting the left second coding unit 1710a, independently of the right second coding unit 1710b. Because the third coding units 1720a and 1720b are determined by splitting the left second coding unit 1710a in a horizontal direction, the third coding units 1720a and 1720b may be processed in a vertical direction order 1720c. Because the left and right second coding units 1710a and 1710b are processed in the horizontal direction order 1710c, the right second coding unit 1710b may be processed after the third coding units 1720a and 1720b included in the left second coding unit 1710a are processed in the vertical direction order 1720c. An operation of determining a processing order of coding units based on a coding unit before being split is not limited to the above-described example, and various methods may be used to independently process coding units, which are split and determined to various shapes, in a predetermined order.

Figure 18:
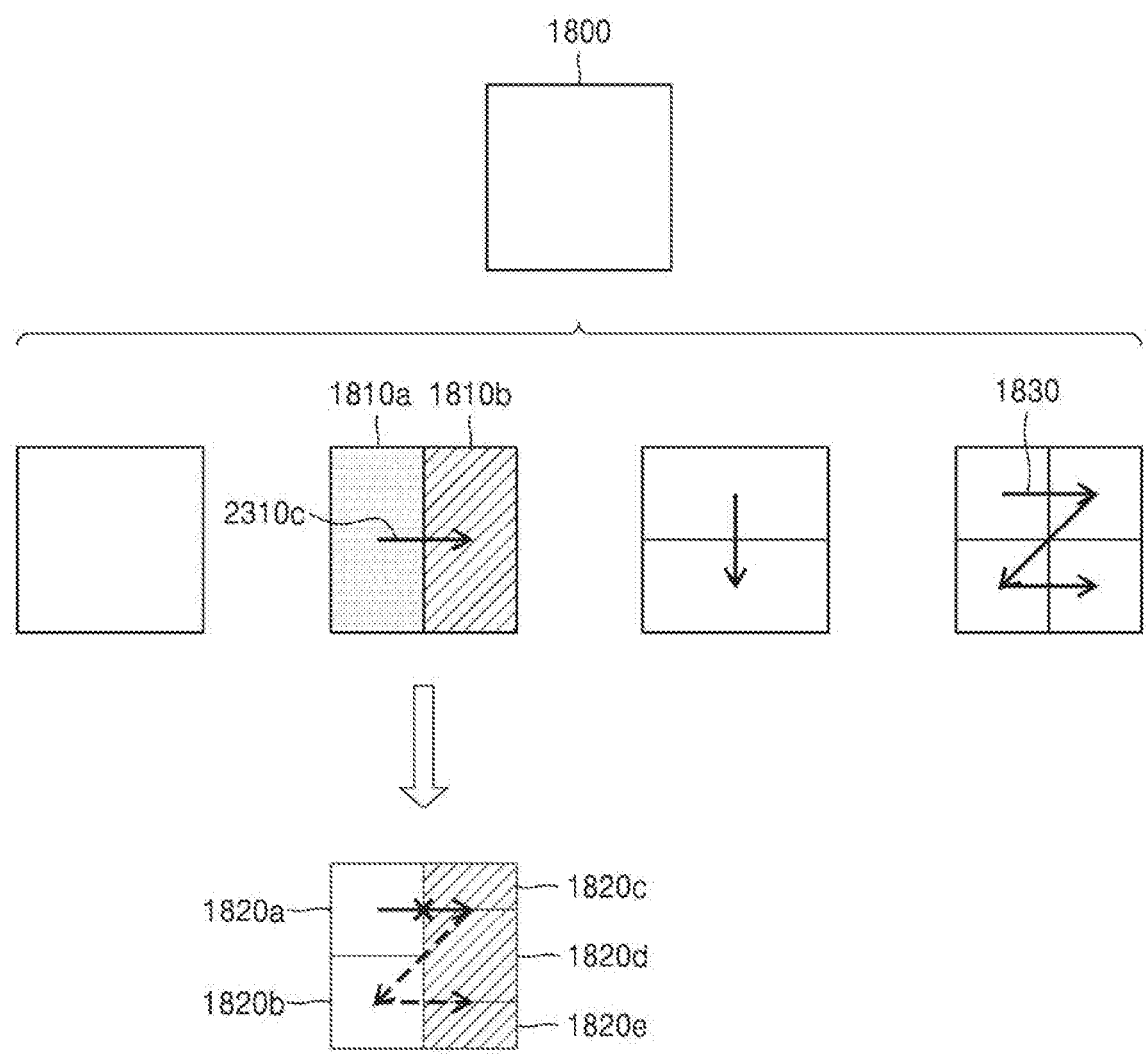
FIG. 18 illustrates a process of determining that a current coding unit is to be split into an odd number of coding units, when coding units are not processable in a predetermined order, according to an embodiment.

FIG. 18 illustrates a process, performed by the image decoding apparatus 200, of determining that a current coding unit is to be split into an odd number of coding units, when the coding units are not processable in a predetermined order, according to an embodiment.

According to an embodiment, the image decoding apparatus 200 may determine whether the current coding unit is split into an odd number of coding units, based on obtained block shape information and split shape information. Referring to FIG. 18, a square first coding unit 1800 may be split into non-square second coding units 1810a and 1810b, and the second coding units 1810a and 1810b may be independently split into third coding units 1820a and 1820b, and 1820c to 1820e. According to an embodiment, the image decoding apparatus 200 may determine a plurality of third coding units 1820a and 1820b by splitting the left second coding unit 1810a in a horizontal direction, and may split the right second coding unit 1810b into an odd number of third coding units 1820c to 1820e.

According to an embodiment, the image decoding apparatus 200 may determine whether any coding unit is split into an odd number of coding units, by determining whether the third coding units 1820a and 1820b, and 1820c to 1820e are processable in a predetermined order. Referring to FIG. 18, the image decoding apparatus 200 may determine the third coding units 1820a and 1820b, and 1820c to 1820e by recursively splitting the first coding unit 1800. The image decoding apparatus 200 may determine whether any of the first coding unit 1800, the second coding units 1810a and 1810b, and the third coding units 1820a and 1820b, and 1820c, 1820d, and 1820e are split into an odd number of coding units, based on at least one of the block shape information and the split shape information. For example, the right second coding unit 1810b may be split into an odd number of third coding units 1820c, 1820d, and 1820e. A processing order of a plurality of coding units included in the first coding unit 1800 may be a predetermined order (e.g., a Z-scan order 1830), and the image decoding apparatus 200 may decide whether the third coding units 1820c, 1820d, and 1820e, which are determined by splitting the right second coding unit 1810b into an odd number of coding units, satisfy a condition for processing in the predetermined order.

According to an embodiment, the image decoding apparatus 200 may determine whether the third coding units 1820a and 1820b, and 1820c, 1820d, and 1820e included in the first coding unit 1800 satisfy the condition for processing in the predetermined order, and the condition relates to whether at least one of a width and height of the second coding units 1810a and 1810b is divided in half along a boundary of the third coding units 1820a and 1820b, and 1820c, 1820d, and 1820e. For example, the third coding units 1820a and 1820b determined by dividing the height of the non-square left second coding unit 1810a in half satisfy the condition. However, because boundaries of the third coding units 1820c, 1820d, and 1820e determined by splitting the right second coding unit 1810b into three coding units do not divide the width or height of the right second coding unit 1810b in half, it may be determined that the third coding units 1820c, 1820d, and 1820e do not satisfy the condition. When the condition is not satisfied as described above, the image decoding apparatus 200 may decide disconnection of a scan order, and determine that the right second coding unit 1810b is split into an odd number of coding units, based on a result of the decision. According to an embodiment, when a coding unit is split into an odd number of coding units, the image decoding apparatus 200 may put a predetermined restriction on a coding unit at a predetermined location among the split coding units. The restriction or the predetermined location has been described above in relation to various embodiments, and thus detailed descriptions thereof will not be provided here.

Figure 19:
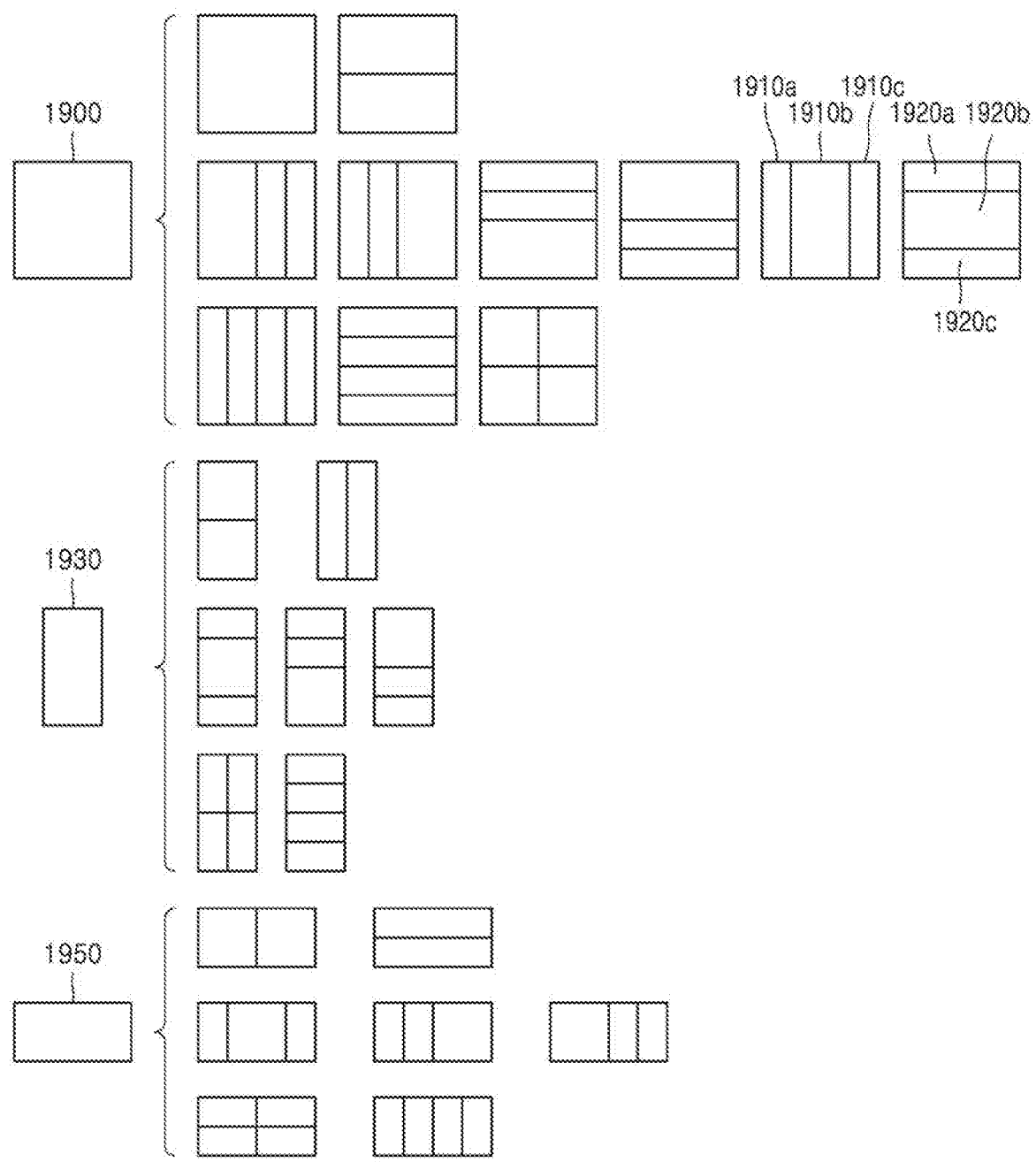
FIG. 19 illustrates a process of determining at least one coding unit by splitting a first coding unit, according to an embodiment.

FIG. 19 illustrates a process, performed by the image decoding apparatus 200, of determining at least one coding unit by splitting a first coding unit 1900, according to an embodiment. According to an embodiment, the image decoding apparatus 200 may split the first coding unit 1900, based on at least one of block shape information and split shape information, which is obtained by the receiver 210. The square first coding unit 1900 may be split into four square coding units, or may be split into a plurality of non-square coding units. For example, referring to FIG. 19, when the block shape information indicates that the first coding unit 1900 has a square shape and the split shape information indicates to split the first coding unit 1900 into non-square coding units, the image decoding apparatus 200 may split the first coding unit 1900 into a plurality of non-square coding units. In detail, when the split shape information indicates to determine an odd number of coding units by splitting the first coding unit 1900 in a horizontal direction or a vertical direction, the image decoding apparatus 200 may split the square first coding unit 1900 into an odd number of coding units, e.g., second coding units 1910a, 1910b, and 1910c determined by splitting the square first coding unit 1900 in a vertical direction or second coding units 1920a, 1920b, and 1920c determined by splitting the square first coding unit 1900 in a horizontal direction.

According to an embodiment, the image decoding apparatus 200 may determine whether the second coding units 1910a, 1910b, 1910c, 1920a, 1920b, and 1920c included in the first coding unit 1900 satisfy a condition for processing in a predetermined order, and the condition relates to whether at least one of a width and height of the first coding unit 1900 is divided in half along a boundary of the second coding units 1910a, 1910b, 1910c, 1920a, 1920b, and 1920c. Referring to FIG. 19, because boundaries of the second coding units 1910a, 1910b, and 1910c determined by splitting the square first coding unit 1900 in a vertical direction do not divide the width of the first coding unit 1900 in half, it may be determined that the first coding unit 1900 does not satisfy the condition for processing in the predetermined order. In addition, because boundaries of the second coding units 1920a, 1920b, and 1920c determined by splitting the square first coding unit 1900 in a horizontal direction do not divide the width of the first coding unit 1900 in half, it may be determined that the first coding unit 1900 does not satisfy the condition for processing in the predetermined order. When the condition is not satisfied as described above, the image decoding apparatus 200 may decide disconnection of a scan order, and may determine that the first coding unit 1900 is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 200 may determine various-shaped coding units by splitting a first coding unit.

Referring to FIG. 19, the image decoding apparatus 200 may split the square first coding unit 1900 or a non-square first coding unit 1930 or 1950 into various-shaped coding units.

Figure 20:
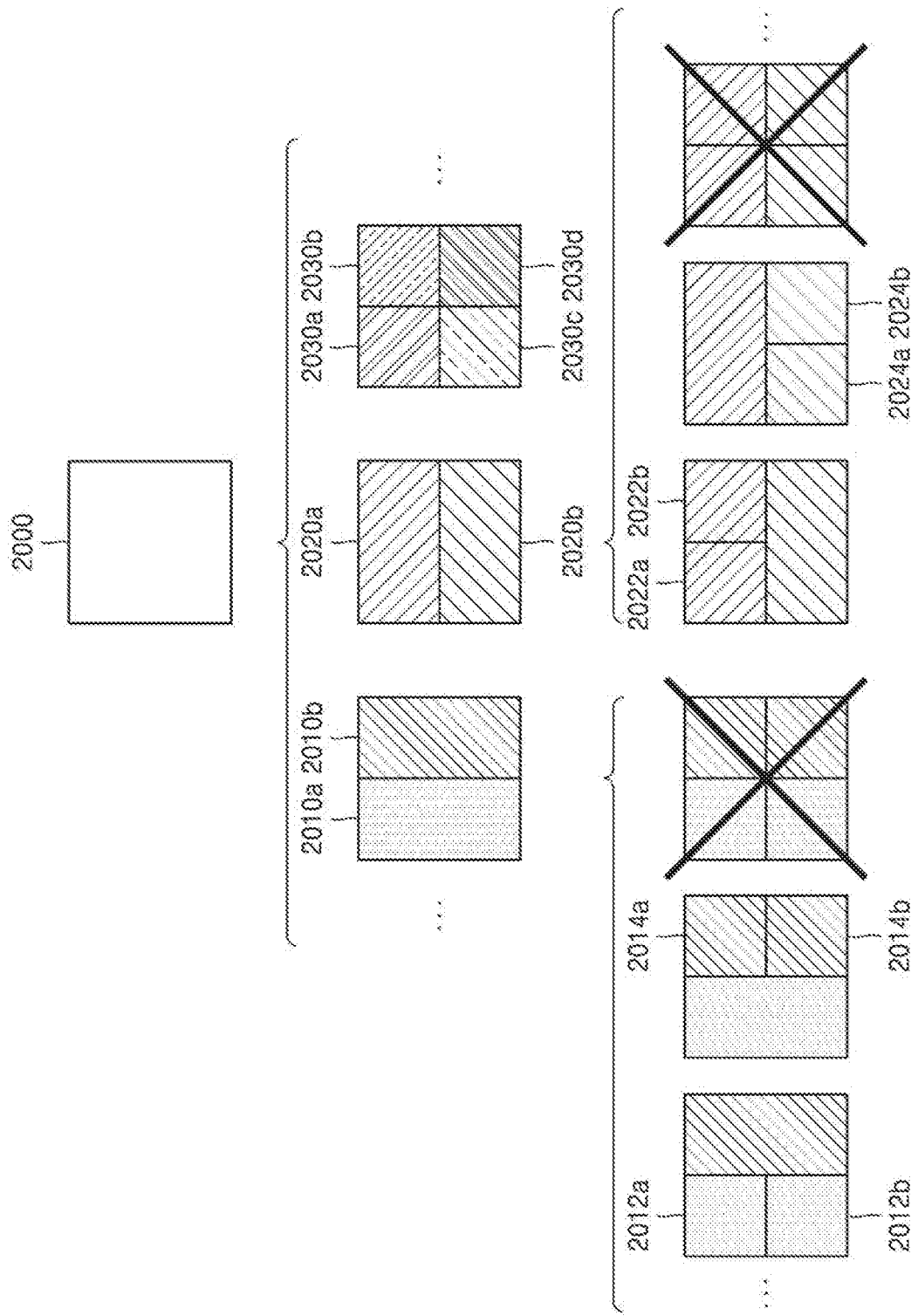
FIG. 20 illustrates that a shape into which a second coding unit is splittable is restricted when the second coding unit having a non-square shape, which is determined by splitting a first coding unit, satisfies a predetermined condition, according to an embodiment.

FIG. 20 illustrates that a shape into which a second coding unit is splittable by the image decoding apparatus 200 is restricted when the second coding unit having a non-square shape, which is determined by splitting a first coding unit 2000, satisfies a predetermined condition, according to an embodiment.

According to an embodiment, the image decoding apparatus 200 may determine to split the square first coding unit 2000 into non-square second coding units 2010a, 2010b, 2020a, and 2020b, based on at least one of block shape information and split shape information, which is obtained by the receiver 210. The second coding units 2010a, 2010b, 2020a, and 2020b may be independently split. As such, the image decoding apparatus 200 may determine to split or not to split the first coding unit 2000 into a plurality of coding units, based on at least one of the block shape information and the split shape information of each of the second coding units 2010a, 2010b, 2020a, and 2020b. According to an embodiment, the image decoding apparatus 200 may determine third coding units 2012a and 2012b by splitting the non-square left second coding unit 2010a, which is determined by splitting the first coding unit 2000 in a vertical direction, in a horizontal direction. However, when the left second coding unit 2010a is split in a horizontal direction, the image decoding apparatus 200 may restrict the right second coding unit 2010b to not be split in a horizontal direction in which the left second coding unit 2010a is split. When third coding units 2014a and 2014b are determined by splitting the right second coding unit 2010b in a same direction, because the left and right second coding units 2010a and 2010b are independently split in a horizontal direction, the third coding units 2012a, 2012b, 2014a, and 2014b may be determined. However, this case serves equally as a case in which the image decoding apparatus 200 splits the first coding unit 2000 into four square second coding units 2030a, 2030b, 2030c, and 2030d, based on at least one of the block shape information and the split shape information, and may be inefficient in terms of image decoding.

According to an embodiment, the image decoding apparatus 200 may determine third coding units 2022a, 2022b, 2024a, and 2024b by splitting the non-square second coding unit 2020a or 2020b, which is determined by splitting a first coding unit 11600 in a horizontal direction, in a vertical direction. However, when a second coding unit (e.g., the upper second coding unit 2020a) is split in a vertical direction, for the above-described reason, the image decoding apparatus 200 may restrict the other second coding unit (e.g., the lower second coding unit 2020b) to not be split in a vertical direction in which the upper second coding unit 2020a is split.

Figure 21:
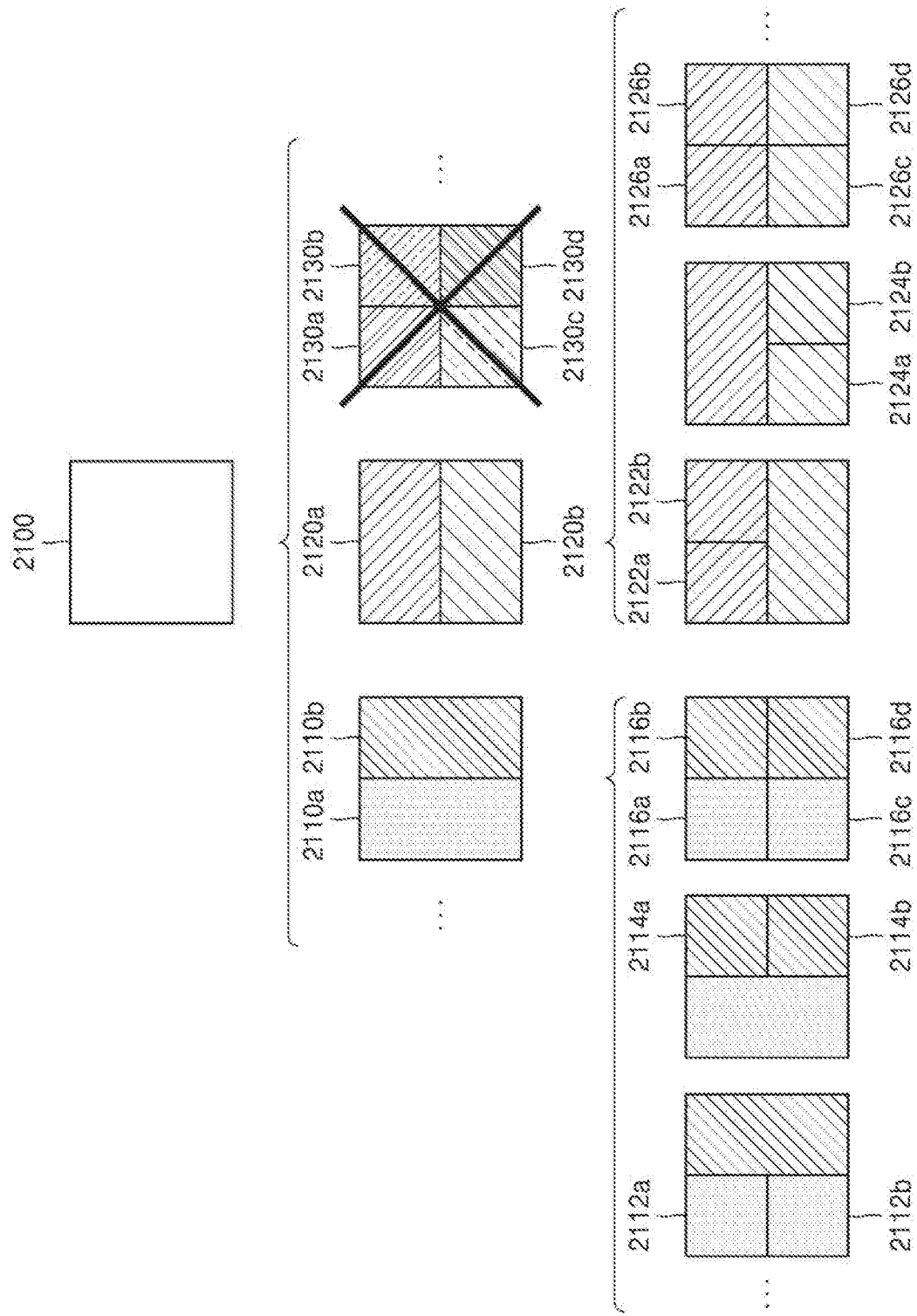
FIG. 21 illustrates a process of splitting a square coding unit when split shape information indicates that the square coding unit is not to be split into four square shapes, according to an embodiment.

FIG. 21 illustrates a process, performed by the image decoding apparatus 200, of splitting a square coding unit when split shape information indicates that the square coding unit is not to be split into four square coding units, according to an embodiment.

According to an embodiment, the image decoding apparatus 200 may determine second coding units 2110a, 2110b, 2120a, 2120b, etc. by splitting a first coding unit 2100, based on at least one of block shape information and split shape information. The split shape information may include information about various methods of splitting a coding unit but, the information about various splitting methods may not include information for splitting a coding unit into four square coding units. According to such split shape information, the image decoding apparatus 200 may not split the first square coding unit 2100 into four square second coding units 2130a, 2130b, 2130c, and 2130d. The image decoding apparatus 200 may determine the non-square second coding units 2110a, 2110b, 2120a, 2120b, etc., based on the split shape information.

According to an embodiment, the image decoding apparatus 200 may independently split the non-square second coding units 2110a, 2110b, 2120a, 2120b, etc. Each of the second coding units 2110a, 2110b, 2120a, 2120b, etc. may be recursively split in a predetermined order, and this splitting method may correspond to a method of splitting the first coding unit 2100, based on at least one of the block shape information and the split shape information.

For example, the image decoding apparatus 200 may determine square third coding units 2112a and 2112b by splitting the left second coding unit 2110a in a horizontal direction, and may determine square third coding units 2114a and 2114b by splitting the right second coding unit 2110b in a horizontal direction. Furthermore, the image decoding apparatus 200 may determine square third coding units 2116a, 2116b, 2116c, and 2116d by splitting both of the left and right second coding units 2110a and 2110b in a horizontal direction. In this case, coding units having the same shape as the four square second coding units 2130a, 2130b, 2130c, and 2130d split from the first coding unit 2100 may be determined.

As another example, the image decoding apparatus 200 may determine square third coding units 2122a and 2122b by splitting the upper second coding unit 2120a in a vertical direction, and may determine square third coding units 2124a and 2124b by splitting the lower second coding unit 2120b in a vertical direction. Furthermore, the image decoding apparatus 200 may determine square third coding units 2122a, 2122b, 2124a, and 2124b by splitting both of the upper and lower second coding units 2120a and 2120b in a vertical direction. In this case, coding units having the same shape as the four square second coding units 2130a, 2130b, 2130c, and 2130d split from the first coding unit 2100 may be determined.

Figure 22:
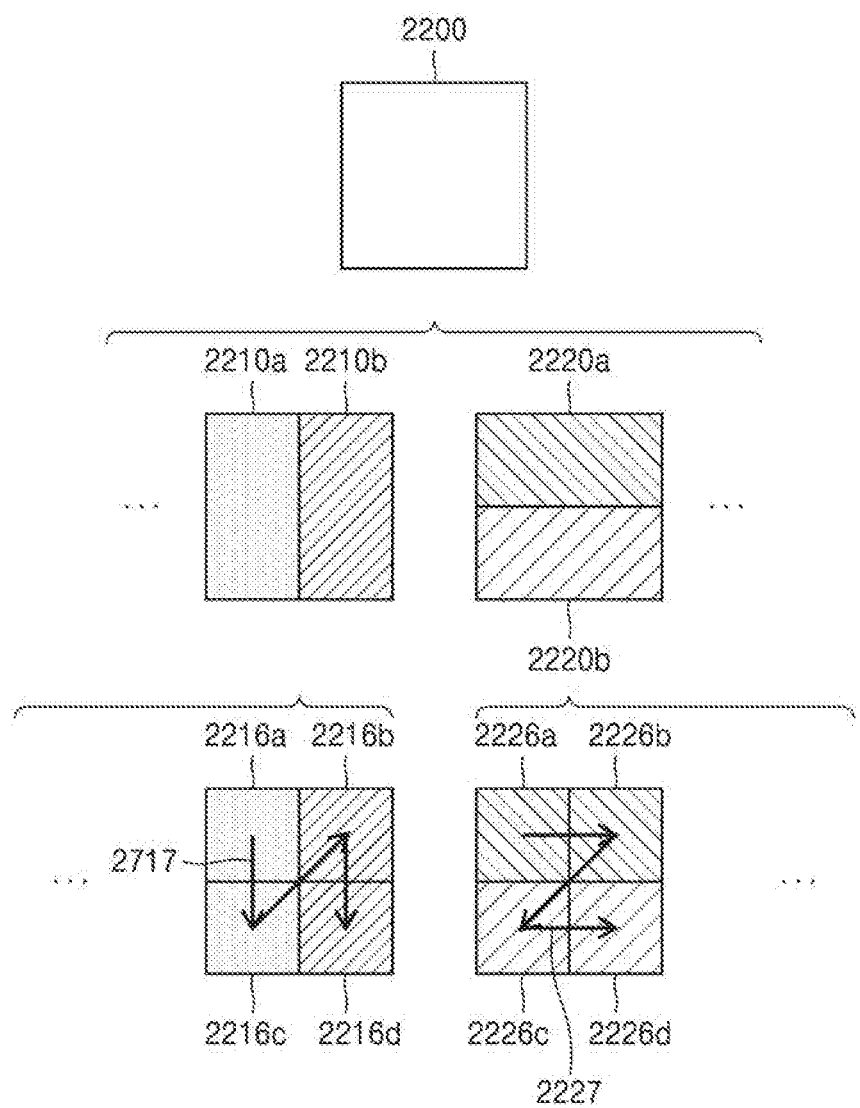
FIG. 22 illustrates that a processing order between a plurality of coding units may be changed depending on a process of splitting a coding unit, according to an embodiment.

FIG. 22 illustrates that a processing order between a plurality of coding units may be changed depending on a process of splitting a coding unit, according to an embodiment.

According to an embodiment, the image decoding apparatus 200 may split a first coding unit 2200, based on block shape information and split shape information. When the block shape information indicates a square shape and the split shape information indicates to split the first coding unit 2200 in at least one of horizontal and vertical directions, the image decoding apparatus 200 may determine second coding units 2210a, 2210b, 2220a, and 2220b, by splitting the first coding unit 2200. Referring to FIG. 22, the non-square second coding units 2210a, 2210b, 2220a, and 2220b determined by splitting the first coding unit 2200 in only a horizontal direction or vertical direction may be independently split based on the block shape information and the split shape information of each coding unit. For example, the image decoding apparatus 200 may determine third coding units 2216a, 2216b, 2216c, and 2216d by splitting the second coding units 2210a and 2210b, which are generated by splitting the first coding unit 2200 in a vertical direction, in a horizontal direction, and may determine third coding units 2226a, 2226b, 2226c, and 2226d by splitting the second coding units 2220a and 2220b, which are generated by splitting the first coding unit 2200 in a horizontal direction, in a horizontal direction. An operation of splitting the second coding units 2210a, 2210b, 2220a, and 2220b has been described above in relation to FIG. 20, and thus detailed descriptions thereof will not be provided herein.

According to an embodiment, the image decoding apparatus 200 may process coding units in a predetermined order. An operation of processing coding units in a predetermined order has been described above in relation to FIG. 17, and thus detailed descriptions thereof will not be provided herein. Referring to FIG. 22, the image decoding apparatus 200 may determine four square third coding units 2216a, 2216b, 2216c, and 2216d, and 2226a, 2226b, 2226c, and 2226d by splitting the square first coding unit 2200. According to an embodiment, the image decoding apparatus 200 may determine processing orders of the third coding units 2216a, 2216b, 2216c, and 2216d, and 2226a, 2226b, 2226c, and 2226d based on a splitting method of the first coding unit 2200.

According to an embodiment, the image decoding apparatus 200 may determine the third coding units 2216a, 2216b, 2216c, and 2216d by splitting the second coding units 2210a and 2210b generated by splitting the first coding unit 2200 in a vertical direction, in a horizontal direction, and may process the third coding units 2216a, 2216b, 2216c, and 2216d in a processing order 2217 for initially processing the third coding units 2216a and 2216b, which are included in the left second coding unit 2210a, in a vertical direction and then processing the third coding unit 2216c and 2216d, which are included in the right second coding unit 2210b, in a vertical direction.

According to an embodiment, the image decoding apparatus 200 may determine the third coding units 2226a, 2226b, 2226c, and 2226d by splitting the second coding units 2220a and 2220b generated by splitting the first coding unit 2200 in a horizontal direction, in a vertical direction, and may process the third coding units 2226a, 2226b, 2226c, and 2226d in a processing order 2227 for initially processing the third coding units 2226a and 2226b, which are included in the upper second coding unit 2220a, in a horizontal direction and then processing the third coding unit 2226c and 2226d, which are included in the lower second coding unit 2220b, in a horizontal direction.

Referring to FIG. 22, the square third coding units 2216a, 2216b, 2216c, and 2216d, and 2226a, 2226b, 2226c, and 2226d may be determined by splitting the second coding units 2210a, 2210b, 2220a, and 2220b, respectively. Although the second coding units 2210a and 2210b are determined by splitting the first coding unit 2200 in a vertical direction differently from the second coding units 2220a and 2220b which are determined by splitting the first coding unit 2200 in a horizontal direction, the third coding units 2216a, 2216b, 2216c, and 2216d, and 2226a, 2226b, 2226c, and 2226d split therefrom eventually show same-shaped coding units split from the first coding unit 2200. As such, by recursively splitting a coding unit in different manners based on at least one of the block shape information and the split shape information, the image decoding apparatus 200 may process a plurality of coding units in different orders even when the coding units are eventually determined to be the same shape.

FIG. 23 illustrates a process of determining a depth of a coding unit as a shape and size of the coding unit change, when the coding unit is recursively split such that a plurality of coding units are determined, according to an embodiment.

According to an embodiment, the image decoding apparatus 200 may determine the depth of the coding unit, based on a predetermined criterion. For example, the predetermined criterion may be the length of a long side of the coding unit. When the length of a long side of a coding unit before being split is $2^n$ times (n>0) the length of a long side of a split current coding unit, the image decoding apparatus 200 may determine that a depth of the current coding unit is increased from a depth of the coding unit before being split, by n. In the following description, a coding unit having an increased depth is expressed as a coding unit of a deeper depth.

Referring to FIG. 23, according to an embodiment, the image decoding apparatus 200 may determine a second coding unit 2302 and a third coding unit 2304 of deeper depths by splitting a square first coding unit 2300 based on block shape information indicating a square shape (for example, the block shape information may be expressed as '0: SQUARE'). Assuming that the size of the square first coding unit 2300 is 2N×2N, the second coding unit 2302 determined by dividing a width and height of the first coding unit 2300 to $½^1$ may have a size of N×N. Furthermore, the third coding unit 2304 determined by dividing a width and height of the second coding unit 2302 to ½ may have a size of N/2×N/2. In this case, a width and height of the third coding unit 2304 are $½^2$ times those of the first coding unit 2300. When a depth of the first coding unit 2300 is D, a depth of the second coding unit 2302, the width and height of which are $½^1$ times those of the first coding unit 2300, may be D+1, and a depth of the third coding unit 2304, the width and height of which are $½^2$ times those of the first coding unit 2300, may be D+2.

According to an embodiment, the image decoding apparatus 200 may determine a second coding unit 2312 or 2322 and a third coding unit 2314 or 2324 of deeper depths by splitting a non-square first coding unit 2310 or 2320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 200 may determine a second coding unit 2302, 2312, or 2322 by dividing at least one of a width and height of the first coding unit 2310 having a size of N×2N. That is, the image decoding apparatus 200 may determine the second coding unit 2302 having a size of N×N or the second coding unit 2322 having a size of N×N/2 by splitting the first coding unit 2310 in a horizontal direction, and may determine the second coding unit 2312 having a size of N/2×N by splitting the first coding unit 2310 in horizontal and vertical directions.

According to an embodiment, the image decoding apparatus 200 may determine the second coding unit 2302, 2312, or 2322 by dividing at least one of a width and height of the first coding unit 2320 having a size of 2N×N. That is, the image decoding apparatus 200 may determine the second coding unit 2302 having a size of N×N or the second coding unit 2312 having a size of N/2×N by splitting the first coding unit 2320 in a vertical direction, and may determine the second coding unit 2322 having a size of N×N/2 by splitting the first coding unit 2320 in horizontal and vertical directions.

According to an embodiment, the image decoding apparatus 200 may determine a third coding unit 2304, 2314, or 2324 by dividing at least one of a width and height of the second coding unit 2302 having a size of N×N. That is, the image decoding apparatus 200 may determine the third coding unit 2304 having a size of N/2×N/2, the third coding unit 2314 having a size of $N/2^2 \times N/2$, or the third coding unit 2324 having a size of $N/2 \times N/2^2$ by splitting the second coding unit 2302 in vertical and horizontal directions.

According to an embodiment, the image decoding apparatus 200 may determine the third coding unit 2304, 2314, or 2324 by dividing at least one of a width and height of the second coding unit 2312 having a size of N/2×N. That is, the image decoding apparatus 200 may determine the third coding unit 2304 having a size of N/2×N/2 or the third coding unit 2324 having a size of $N/2 \times N/2^2$ by splitting the second coding unit 2312 in a horizontal direction, or may determine the third coding unit 2314 having a size of $N/2^2 \times N/2$ by splitting the second coding unit 2312 in vertical and horizontal directions.

According to an embodiment, the image decoding apparatus 200 may determine the third coding unit 2304, 2314, or 2324 by dividing at least one of a width and height of the second coding unit 2314 having a size of N×N/2. That is, the image decoding apparatus 200 may determine the third coding unit 2304 having a size of N/2×N/2 or the third coding unit 2314 having a size of $N/2^2 \times N/2$ by splitting the second coding unit 2312 in a vertical direction, or may determine the third coding unit 2324 having a size of $N/2 \times N/2^2$ by splitting the second coding unit 2312 in vertical and horizontal directions.

According to an embodiment, the image decoding apparatus 200 may split the square coding unit 2300, 2302, or 2304 in a horizontal or vertical direction. For example, the image decoding apparatus 200 may determine the first coding unit 2310 having a size of N×2N by splitting the first coding unit 2300 having a size of 2N×2N in a vertical direction, or may determine the first coding unit 2320 having a size of 2N×N by splitting the first coding unit 2300 in a horizontal direction. According to an embodiment, when a depth is determined based on the length of the longest side of a coding unit, a depth of a coding unit determined by splitting the first coding unit 2300, 2302 or 2304 having a size of 2N×2N in a horizontal or vertical direction may be the same as the depth of the first coding unit 2300, 2302 or 2304.

According to an embodiment, a width and height of the third coding unit 2314 or 2324 may be $\frac{1}{2}^2$ times those of the first coding unit 2310 or 2320. When a depth of the first coding unit 2310 or 2320 is D, a depth of the second coding unit 2312 or 2314, the width and height of which are ½ times those of the first coding unit 2310 or 2320, may be D+1, and a depth of the third coding unit 2314 or 2324, the width and height of which are $\frac{1}{2}^2$ times those of the first coding unit 2310 or 2320, may be D+2.

Figure 24:
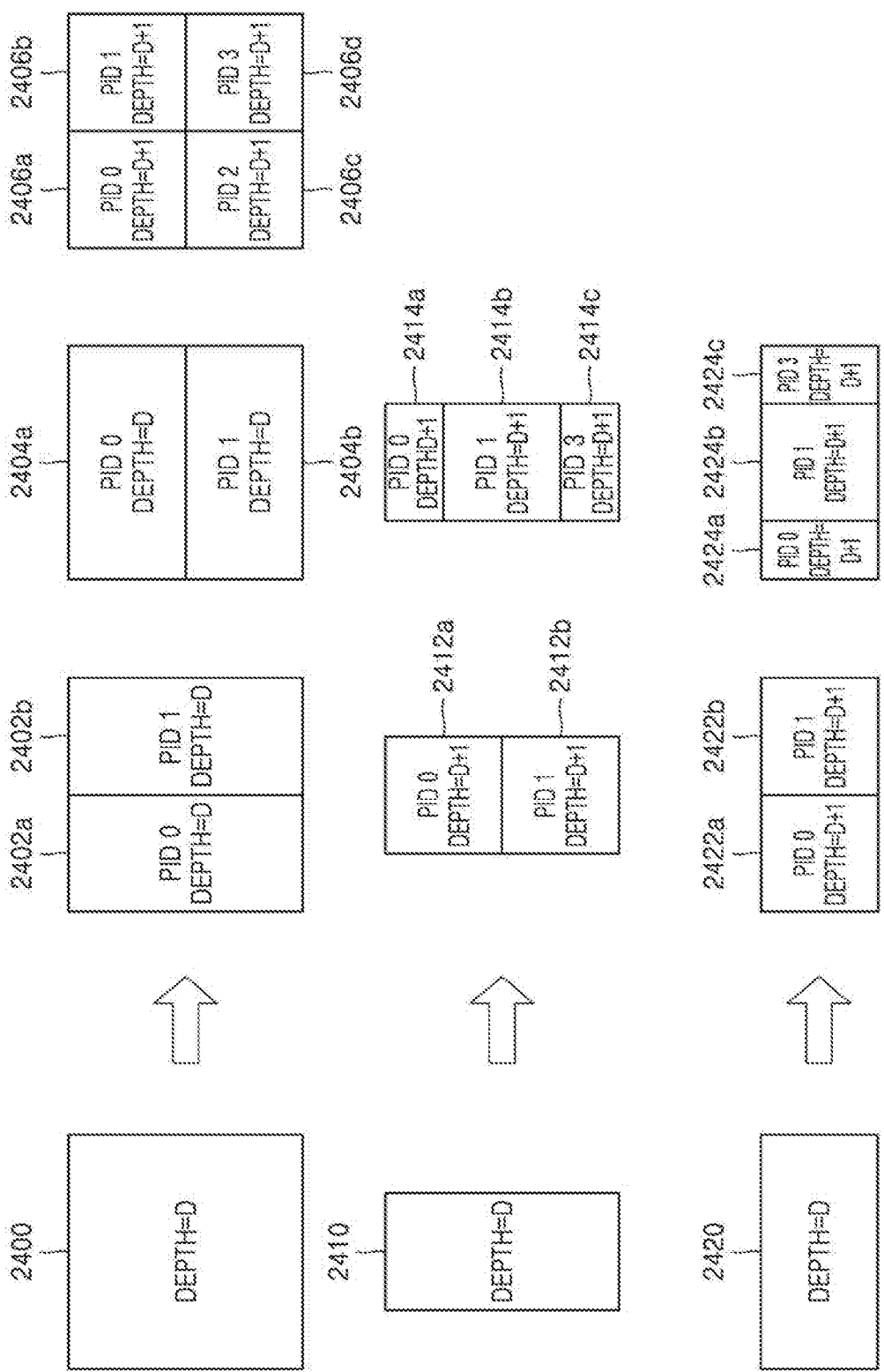
FIG. 24 illustrates depths that are determinable based on shapes and sizes of coding units, and part indexes (PIDs) that are for distinguishing the coding units, according to an embodiment.

FIG. 24 illustrates depths that are determinable based on shapes and sizes of coding units, and part indexes (PIDs) that are for distinguishing the coding units, according to an embodiment.

According to an embodiment, the image decoding apparatus 200 may determine various-shape second coding units by splitting a square first coding unit 2400. Referring to FIG. 24, the image decoding apparatus 200 may determine second coding units 2402a and 2402b, 2404a and 2404b, and 2406a, 2406b, 2406c, and 2406d by splitting the first coding unit 2400 in at least one of vertical and horizontal directions based on split shape information. That is, the image decoding apparatus 200 may determine the second coding units 2402a and 2402b, 2404a and 2404b, and 2406a, 2406b, 2406c, and 2406d, based on the split shape information of the first coding unit 2400.

According to an embodiment, a depth of the second coding units 2402a and 2402b, 2404a and 2404b, and 2406a, 2406b, 2406c, and 2406d, which are determined based on the split shape information of the square first coding unit 2400, may be determined based on the length of a long side thereof. For example, because the length of a side of the square first coding unit 2400 equals the length of a long side of the non-square second coding units 2402a and 2402b, and 2404a and 2404b, the first coding unit 2400 and the non-square second coding units 2402a and 2402b, and 2404a and 2404b may have the same depth, e.g., D. However, when the image decoding apparatus 200 splits the first coding unit 2400 into the four square second coding units 2406a, 2406b, 2406c, and 2406d based on the split shape information, because the length of a side of the square second coding units 2406a, 2406b, 2406c, and 2406d is ½ times the length of a side of the first coding unit 2400, a depth of the second coding units 2406a, 2406b, 2406c, and 2406d may be D+1 which is deeper than the depth D of the first coding unit 2400 by 1.

According to an embodiment, the image decoding apparatus 200 may determine a plurality of second coding units 2412a and 2412b, and 2414a, 2414b, and 2414c by splitting a first coding unit 2410, a height of which is longer than a width, in a horizontal direction based on the split shape information. According to an embodiment, the image decoding apparatus 200 may determine a plurality of second coding units 2422a and 2422b, and 2424a, 2424b, and 2424c by splitting a first coding unit 2420, a width of which is longer than a height, in a vertical direction based on the split shape information.

According to an embodiment, a depth of the second coding units 2412a, 2412b, 2414a, 2414b, 2116a, 2116b, 2116c, and 2116d, which are determined based on the split shape information of the non-square first coding unit 2410 or 2420, may be determined based on the length of a long side thereof. For example, because the length of a side of the square second coding units 2412a and 2412b is ½ times the length of a side of the first coding unit 2410 having a non-square shape, a height of which is longer than a width, a depth of the square second coding units 2402a, 2402b, 2404a, and 2404b is D+1 which is deeper than the depth D of the non-square first coding unit 2410 by 1.

Furthermore, the image decoding apparatus 200 may split the non-square first coding unit 2410 into an odd number of second coding units 2414a, 2414b, and 2414c based on the split shape information. The odd number of second coding units 2414a, 2414b, and 2414c may include the non-square second coding units 2414a and 2414c and the square second coding unit 2414b. In this case, because the length of a long side of the non-square second coding units 2414a and 2414c and the length of a side of the square second coding unit 2414*b* are ½ times the length of a side of the first coding unit 2410, a depth of the second coding units 2414*a*, 2414*b*, and 2414*c* may be D+1 which is deeper than the depth D of the non-square first coding unit 2410 by 1. The image decoding apparatus 200 may determine depths of coding units split from the first coding unit 2420 having a non-square shape, a width of which is longer than a height, by using the above-described method of determining depths of coding units split from the first coding unit 2410.

According to an embodiment, the image decoding apparatus 200 may determine PIDs for identifying split coding units, based on a size ratio between the coding units when an odd number of split coding units do not have equal sizes. Referring to FIG. 24, a coding unit 2414*b* of a center location among an odd number of split coding units 2414*a*, 2414*b*, and 2414*c* may have a width equal to that of the other coding units 2414*a* and 2414*c* and a height which is two times that of the other coding units 2414*a* and 2414*c*. That is, in this case, the coding unit 2414*b* at the center location may include two of the other coding unit 2414*a* or 2414*c*. Therefore, when a PID of the coding unit 2414*b* at the center location is 1 based on a scan order, a PID of the coding unit 2414*c* located next to the coding unit 2414*b* may be increased by 2 and thus may be 3. That is, discontinuity in PID values may be present. According to an embodiment, the image decoding apparatus 200 may determine whether an odd number of split coding units do not have equal sizes, based on whether discontinuity is present in PIDs for identifying the split coding units.

According to an embodiment, the image decoding apparatus 200 may determine whether to use a specific splitting method, based on PID values for identifying a plurality of coding units determined by splitting a current coding unit. Referring to FIG. 24, the image decoding apparatus 200 may determine an even number of coding units 2412*a* and 2412*b* or an odd number of coding units 2414*a*, 2414*b*, and 2414*c* by splitting the first coding unit 2410 having a rectangular shape, a height of which is longer than a width. The image decoding apparatus 200 may use PIDs to identify respective coding units. According to an embodiment, the PID may be obtained from a sample of a predetermined location of each coding unit (e.g., a top left sample).

According to an embodiment, the image decoding apparatus 200 may determine a coding unit at a predetermined location from among the split coding units, by using the PIDs for distinguishing the coding units. According to an embodiment, when the split shape information of the first coding unit 2410 having a rectangular shape, a height of which is longer than a width, indicates to split a coding unit into three coding units, the image decoding apparatus 200 may split the first coding unit 2410 into three coding units 2414*a*, 2414*b*, and 2414*c*. The image decoding apparatus 200 may assign a PID to each of the three coding units 2414*a*, 2414*b*, and 2414*c*. The image decoding apparatus 200 may compare PIDs of an odd number of split coding units to determine a coding unit at a center location from among the coding units. The image decoding apparatus 200 may determine the coding unit 2414*b* having a PID corresponding to a middle value among the PIDs of the coding units, as the coding unit at the center location from among the coding units determined by splitting the first coding unit 2410. According to an embodiment, the image decoding apparatus 200 may determine PIDs for distinguishing split coding units, based on a size ratio between the coding units when the split coding units do not have equal sizes. Referring to FIG. 24, the coding unit 2414*b* generated by splitting the first coding unit 2410 may have a width equal to that of the other coding units 2414*a* and 2414*c* and a height which is two times that of the other coding units 2414*a* and 2414*c*. In this case, when the PID of the coding unit 2414*b* at the center location is 1, the PID of the coding unit 2414*c* located next to the coding unit 2414*b* may be increased by 2 and thus may be 3. When the PID is not uniformly increased as described above, the image decoding apparatus 200 may determine that a coding unit is split into a plurality of coding units including a coding unit having a size different from that of the other coding units. According to an embodiment, when the split shape information indicates to split a coding unit into an odd number of coding units, the image decoding apparatus 200 may split a current coding unit in such a manner that a coding unit of a predetermined location among an odd number of coding units (e.g., a coding unit of a centre location) has a size different from that of the other coding units. In this case, the image decoding apparatus 200 may determine the coding unit of the centre location, which has a different size, by using PIDs of the coding units. However, the PIDs and the size or location of the coding unit of the predetermined location are not limited to the above-described examples, and various PI Ds and various locations and sizes of coding units may be used.

According to an embodiment, the image decoding apparatus 200 may use a predetermined data unit where a coding unit starts to be recursively split.

Figure 25:
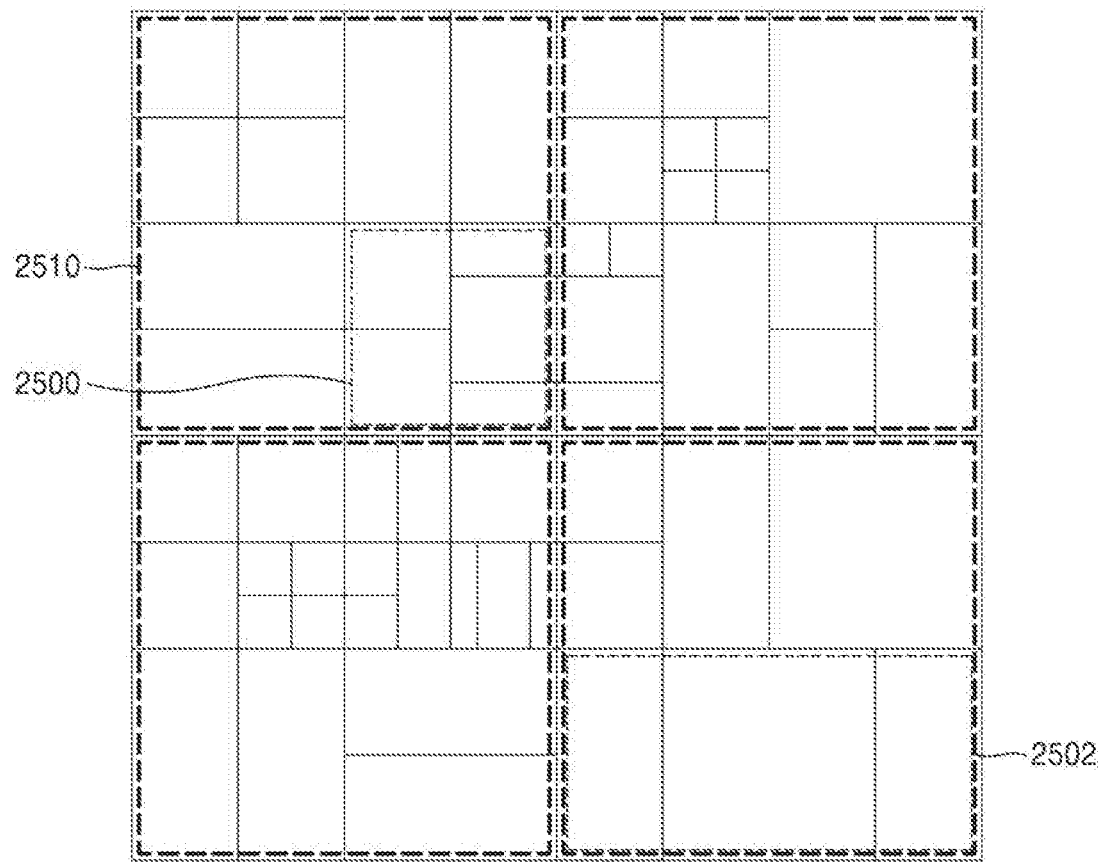
FIG. 25 illustrates a plurality of coding units determined based on a plurality of predetermined data units included in a picture, according to an embodiment.

FIG. 25 illustrates a plurality of coding units determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 200 may split the current picture into a plurality of reference data units. According to an embodiment, the image decoding apparatus 200 may split the plurality of reference data units, which are split from the current picture, by using splitting information about each reference data unit. The operation of splitting the reference data unit may correspond to a splitting operation using a quadtree structure.

According to an embodiment, the image decoding apparatus 200 may previously determine the minimum size allowed for the reference data units included in the current picture. Accordingly, the image decoding apparatus 200 may determine various reference data units having sizes equal to or greater than the minimum size, and may determine one or more coding units by using the block shape information and the split shape information with reference to the determined reference data unit.

Referring to FIG. 25, the image decoding apparatus 200 may use a square reference coding unit 2500 or a non-square reference coding unit 2502. According to an embodiment, the shape and size of reference coding units may be determined based on various data units capable of including one or more reference coding units (e.g., sequences, pictures, slices, slice segments, largest coding units, or the like).

According to an embodiment, the receiver 210 of the image decoding apparatus 200 may obtain, from a bitstream, at least one of reference coding unit shape information and reference coding unit size information with respect to each of the various data units. An operation of splitting the square reference coding unit 2500 into one or more coding units has been described above in relation to the operation of splitting the current coding unit of FIG. 13, and an operation of splitting the non-square reference coding unit 2500 into one or more coding units has been described above in relation to the operation of splitting the current coding unit 1400 or 1450 of FIG. 14, and thus, detailed descriptions thereof will not be provided herein.

According to an embodiment, the image decoding apparatus 200 may use a PID for identifying the size and shape of reference coding units, to determine the size and shape of reference coding units according to some data units previously determined based on a predetermined condition. That is, the receiver 210 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 200 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 200 may determine at least one of the size and shape of reference coding units included in a data unit serving as a unit for obtaining the PID, by selecting the previously determined at least one of the size and shape of reference coding units based on the PID.

According to an embodiment, the image decoding apparatus 200 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 200 may determine the reference coding units by splitting the largest coding unit n times based on a quadtree structure, and may split the reference coding unit based on at least one of the block shape information and the split shape information according to various embodiments.

Figure 26:
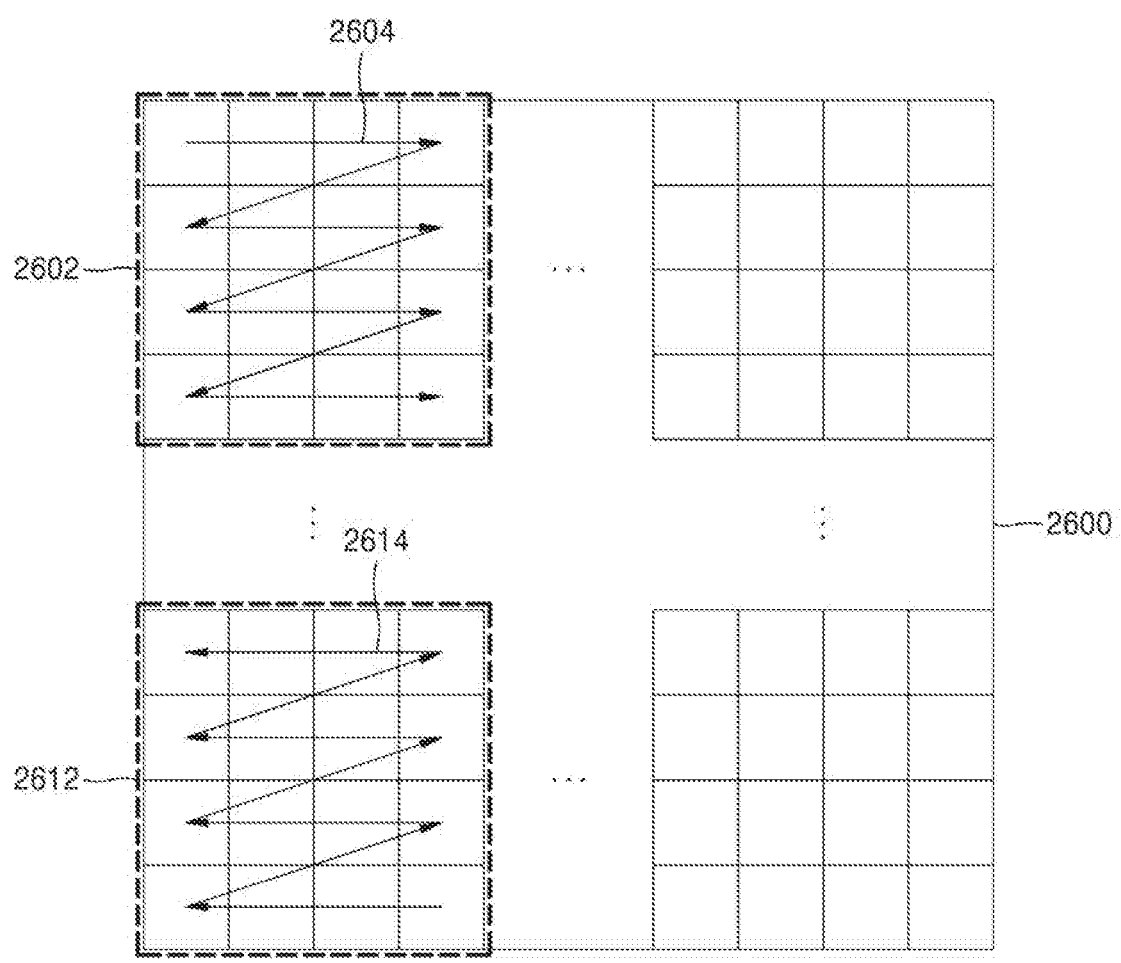
FIG. 26 illustrates a processing block serving as a criterion for determining a determination order of reference coding units included in a picture, according to an embodiment.

FIG. 26 illustrates a processing block serving as a criterion for determining a determination order of reference coding units included in a picture 2600, according to an embodiment.

According to an embodiment, the image decoding apparatus 200 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 200 may obtain processing block size information and may determine the size of one or more processing blocks included in the picture. The image decoding apparatus 200 may obtain the processing block size information from a bitstream and may determine the size of one or more processing blocks included in the picture. The size of processing blocks may be a predetermined size of data units, which is indicated by the processing block size information.

According to an embodiment, the receiver 210 of the image decoding apparatus 200 may obtain the processing block size information from the bitstream according to each specific data unit. For example, the processing block size information may be obtained from the bitstream in a data unit such as an image, sequence, picture, slice, or slice segment. That is, the receiver 210 may obtain the processing block size information from the bitstream according to each of the various data units, and the image decoding apparatus 200 may determine the size of one or more processing blocks, which are split from the picture, by using the obtained processing block size information. The size of the processing blocks may be integer times that of the reference coding units.

According to an embodiment, the image decoding apparatus 200 may determine the size of processing blocks 2602 and 2612 included in the picture 2600. For example, the image decoding apparatus 200 may determine the size of processing blocks based on the processing block size information obtained from the bitstream. Referring to FIG. 26, according to an embodiment, the image decoding apparatus 200 may determine a width of the processing blocks 2602 and 2612 to be four times the width of the reference coding units, and may determine a height of the processing blocks 2602 and 2612 to be four times the height of the reference coding units. The image decoding apparatus 200 may determine a determination order of one or more reference coding units in one or more processing blocks.

According to an embodiment, the image decoding apparatus 200 may determine the processing blocks 2602 and 2612, which are included in the picture 2600, based on the size of processing blocks, and may determine a determination order of one or more reference coding units in the processing blocks 2602 and 2612. According to an embodiment, determination of reference coding units may include determination of the size of the reference coding units.

According to an embodiment, the image decoding apparatus 200 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 200 may obtain, from the bitstream, the determination order information of reference coding units according to each specific data unit. For example, the receiver 210 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 200 may determine one or more reference coding units based on the determined determination order.

According to an embodiment, the receiver 210 may obtain the determination order information of reference coding units from the bitstream as information related to the processing blocks 2602 and 2612, and the image decoding apparatus 200 may determine a determination order of one or more reference coding units included in the processing blocks 2602 and 2612 and determine one or more reference coding units, which are included in the picture 2600, based on the determination order. Referring to FIG. 26, the image decoding apparatus 200 may determine determination orders 2604 and 2614 of one or more reference coding units in the processing blocks 2602 and 2612, respectively. For example, when the determination order information of reference coding units is obtained with respect to each processing block, different types of the determination order information of reference coding units may be obtained for the processing blocks 2602 and 2612. When the determination order 2604 of reference coding units in the processing block 2602 is a raster scan order, reference coding units included in the processing block 2602 may be determined according to a raster scan order. On the contrary, when the determination order 2614 of reference coding units in the other processing block 2612 is a backward raster scan order, reference coding units included in the processing block 2612 may be determined according to the backward raster scan order.

According to an embodiment, the image decoding apparatus 200 may decode the determined one or more reference coding units. The image decoding apparatus 200 may decode an image, based on the reference coding units determined as described above. A method of decoding the reference coding units may include various image decoding methods.

According to an embodiment, the image decoding apparatus 200 may obtain block shape information indicating the shape of a current coding unit or split shape information indicating a splitting method of the current coding unit, from the bitstream, and may use the obtained information. The block shape information or the split shape information may be included in the bitstream related to various data units.

For example, the image decoding apparatus 200 may use the block shape information or the split shape information included in a sequence parameter set, a picture parameter set, a video parameter set, a slice header, or a slice segment header. Furthermore, the image decoding apparatus 200 may obtain, from the bitstream, syntax corresponding to the block shape information or the split shape information according to each largest coding unit, each reference coding unit, or each processing block, and may use the obtained syntax.

This disclosure has been particularly shown and described with reference to embodiments thereof. However, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure may be written as computer programs and can be implemented in general-use digital computers that execute the programs using a computer readable recording medium. Examples of the computer readable recording medium include magnetic storage media (e.g., read-only memories (ROMs), floppy disks, or hard disks), optical recording media (e.g., compact disc (CD)-ROMs or digital versatile disks (DVDs)), etc.

The invention claimed is:

1. An image decoding method comprising:
receiving a bitstream of an encoded image;
generating reconstructed data by reconstructing the encoded image;
obtaining, from the bitstream, information about a content type of the encoded image and information about a quantization parameter (QP) of the encoded image;
from among a first plurality of deep neural network (DNN) filter model candidates trained to perform in-loop filtering, selecting a second plurality of DNN filter model candidates based on one of the information about the content type and the information about the QP;
from among the second plurality of DNN filter model candidates, selecting a DNN filter model based on another one of the information about the content type and the information about the QP; and
performing the in-loop filtering by applying the reconstructed data to the selected DNN filter model,
wherein the information about the content type comprises information indicating a pixel complexity and a degree of motion of the encoded image.

2. The image decoding method of claim 1, wherein the in-loop filtering comprises at least one operation from among deblocking filtering, sample adaptive offset, and adaptive loop filtering.

3. The image decoding method of claim 1, wherein the DNN filter model is a network model trained to compensate for a quantization error of the reconstructed data according to an operation based on a weight of each of a plurality of network nodes constituting the DNN filter model and a connection relationship between the plurality of network nodes.

4. The image decoding method of claim 1, wherein the determining of the DNN filter model comprises determining the DNN filter model corresponding to the content type of the encoded image from among the second plurality of DNN filter model candidates, based on the information about the content type.

5. The image decoding method of claim 4, wherein each of the first plurality of DNN filter model candidates is trained to perform the in-loop filtering on a preset content type.

6. The image decoding method of claim 1, wherein the determining of the DNN filter model further comprises determining the DNN filter model corresponding to a compression strength of the encoded image from among the second plurality of DNN filter model candidates.

7. The image decoding method of claim 1, wherein the performing of the in-loop filtering comprises performing the in-loop filtering by applying the reconstructed data and one or more reference images stored in a reconstructed picture buffer to the selected DNN filter model.

8. The image decoding method of claim 1, wherein the in-loop filtering is performed based on a convolutional neural network (CNN) learning model.

9. An image decoding apparatus comprising:
a receiver configured to receive a bitstream of an encoded image; and
a decoder configured to:
generate reconstructed data by reconstructing the encoded image;
obtain, from the bitstream, information about a content type of the encoded image and information about a quantization parameter (QP) of the encoded image;
from among a first plurality of deep neural network (DNN) filter model candidates trained to perform in-loop filtering, selecting a second plurality of DNN filter model candidates based on one of the information about the content type and the information about the QP;
from among the second plurality of DNN filter model candidates, selecting a DNN filter model based on another one of the information about the content type and the information about the QP; and
performing the in-loop filtering by applying the reconstructed data to the selected DNN filter model,
wherein the information about the content type comprises information indicating a pixel complexity and a degree of motion of the encoded image.

10. An image encoding method comprising:
determining a content type of an input image and a quantization parameter (QP) of the input image;
from among a first plurality of deep neural network (DNN) filter model candidates trained to perform in-loop filtering, selecting a second plurality of DNN filter model candidates based on one of the content type and the QP;
from among the second plurality of DNN filter model candidates, selecting a DNN filter model based on another one of the content type and the QP;
generating the in-loop filtered data by applying, to the selected DNN filter model, reconstructed data of the input image reconstructed from encoded residual data;
generating prediction data by predicting the input image based on the in-loop filtered data and generating residual data by using the input image and the prediction data;
generating a bitstream by encoding information about the content type and the residual data; and
transmitting the bitstream,
wherein the information about the content type comprises information indicating a pixel complexity and a degree of motion of the input image.

11. The image encoding method of claim 10, wherein the in-loop filtering comprises at least one operation from among deblocking filtering, sample adaptive offset, and adaptive loop filtering.

12. The image encoding method of claim 10, wherein the DNN filter model is a network model trained to compensate for a quantization error of the reconstructed data according to an operation based on a weight of each of a plurality of network nodes constituting the DNN filter model and a connection relationship between the plurality of network nodes.

13. The image encoding method of claim 10, wherein the determining of the DNN filter model comprises determining the DNN filter model corresponding to the content type of the input image from among the second plurality of DNN filter model candidates, based on the information about the content type.

14. The image decoding method of claim 1, wherein the determining of the DNN filter model comprises selecting the DNN filter model, based on the information indicating the pixel complexity and the degree of the motion of the encoded image, from among the second plurality of DNN filter model candidates trained to perform the in-loop filtering.

15. The image decoding method of claim 1, wherein the second plurality of DNN filter model candidates is selected based on the information about the QP, and
wherein the selected DNN filter model is selected based on the information about the content type.

16. The image decoding method of claim 1, wherein the second plurality of DNN filter model candidates is selected based on the information about the content type, and
wherein the selected DNN filter model is selected based on the information about the QP.

* * * * *